(12) United States Patent
Kim et al.

(10) Patent No.: US 12,411,318 B2
(45) Date of Patent: Sep. 9, 2025

(54) OPTICAL IMAGING SYSTEM

(71) Applicant: SAMSUNG ELECTRO-MECHANICS CO., LTD., Suwon-si (KR)

(72) Inventors: Hag Chul Kim, Suwon-si (KR); Yong Joo Jo, Suwon-si (KR); Hyo Jin Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 18 days.

(21) Appl. No.: 18/380,257

(22) Filed: Oct. 16, 2023

(65) Prior Publication Data

US 2024/0045179 A1   Feb. 8, 2024

Related U.S. Application Data

(63) Continuation of application No. 17/004,340, filed on Aug. 27, 2020, now Pat. No. 11,822,051.

(30) Foreign Application Priority Data

Aug. 30, 2019  (KR) .................. 10-2019-0107269

(51) Int. Cl.
  *G02B 13/00* (2006.01)
  *G02B 5/04* (2006.01)
  (Continued)

(52) U.S. Cl.
  CPC .......... *G02B 13/0045* (2013.01); *G02B 5/04* (2013.01); *G02B 9/64* (2013.01); *G02B 27/0025* (2013.01); *H04N 23/55* (2023.01)

(58) Field of Classification Search
  CPC ........ G02B 13/0045; G02B 5/04; G02B 9/64; G02B 27/0025; G02B 13/0065;
  (Continued)

(56) References Cited

U.S. PATENT DOCUMENTS 6,934,091 B2   8/2005   Takahashi et al.
7,656,590 B2   2/2010   Miyata et al.
(Continued)

FOREIGN PATENT DOCUMENTS

JP   5963565 B2 *   8/2016
KR   10-0800811 B1   2/2008
TW   I574042 B   3/2017

OTHER PUBLICATIONS

Gross ( "Handbook of Optical Systems," vol. 3: Aberration Theory and Correction of Optical Systems, Wiley VCH—2007, p. 378). (Year: 2007).*
(Continued)

*Primary Examiner* — Bumsuk Won
*Assistant Examiner* — Ray Alexander Dean
(74) *Attorney, Agent, or Firm* — NSIP Law

(57) ABSTRACT

An optical imaging system includes a first lens, a second lens, a third lens, a fourth lens, a fifth lens, a sixth lens, and a seventh lens disposed sequentially from an object side. The optical imaging system satisfies $-2.0 < L3R2/f < -0.5$ and $3.0 < f/IMG\_HT < 4.0$, where L3R2 is a radius of curvature of an image-side surface of the third lens, f is a focal length of the optical imaging system, and IMG_HT is half a diagonal length of an imaging plane.

17 Claims, 23 Drawing Sheets

(51) Int. Cl.
  *G02B 9/64* (2006.01)
  *G02B 27/00* (2006.01)
  *H04N 23/55* (2023.01)
(58) Field of Classification Search
  CPC .......... G02B 15/143503; G02B 3/0037; H04N 23/55; G03B 30/00
  See application file for complete search history.

(56) References Cited

U.S. PATENT DOCUMENTS

| | | | |
|---|---|---|---|
| 7,830,613 | B2 | 11/2010 | Ichikawa |
| 2004/0145818 | A1 | 7/2004 | Ishii |
| 2005/0018313 | A1 | 1/2005 | Kuba |
| 2008/0084616 | A1 | 4/2008 | Katakura |
| 2008/0106800 | A1 | 5/2008 | Shin |
| 2009/0059388 | A1 | 3/2009 | Miyata et al. |
| 2014/0240554 | A1 | 8/2014 | Uchida et al. |
| 2014/0267594 | A1 | 9/2014 | Furumura et al. |
| 2015/0109524 | A1 | 4/2015 | Laroia |
| 2016/0011404 | A1* | 1/2016 | Suzuki ............... G02B 27/0025 359/708 |
| 2017/0192203 | A1 | 7/2017 | Chang |
| 2018/0024314 | A1 | 1/2018 | Tashiro |
| 2019/0094497 | A1 | 3/2019 | Huang |
| 2019/0227282 | A1* | 7/2019 | Son .......................... G02B 9/64 |
| 2022/0413269 | A1 | 12/2022 | Yao et al. |

OTHER PUBLICATIONS

Taiwanese Office Action dated Apr. 15, 2021 issued in counterpart Taiwanese Patent Application No. 109129596. (4 pages in English)(4 pages in Taiwanese).

Taiwanese Office Action issued on Aug. 29, 2022, in counterpart Taiwanese Patent Application No. 110136925 (4 Pages in English, 4 Pages in Mandarin).

Chinese Office Action issued on Sep. 19, 2022, in counterpart Chinese Patent Application No. 202010887480.3 (6 Pages in English, 7 Pages in Chinese).

* cited by examiner

OPTICAL IMAGING SYSTEM

CROSS-REFERENCE TO RELATED APPLICATION(S)

This application is a continuation of U.S. application Ser. No. 17/004,340 filed on Aug. 27, 2020, which claims the benefit under 35 USC 119(a) of Korean Patent Application No. 10-2019-0107269 filed on Aug. 30, 2019 in the Korean Intellectual Property Office, the entire disclosures of which are incorporated herein by reference for all purposes.

BACKGROUND

1. Field

This application relates to an optical imaging system configured to fold an optical path.

2. Description of Related Art

In a retractable imaging system in which a plurality of lenses is disposed in a row, an overall length of the optical imaging system is increased as the number of lenses is increased. For example, it may be more difficult to miniaturize an optical imaging system including five lenses than to miniaturize an optical imaging system including three lenses. For this reason, there is a limitation in mounting a retractable optical imaging system in a portable terminal having a low thickness.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An optical imaging system which may be mounted in a thinned small-sized terminal while having a long focal length.

In one general aspect, an optical imaging system includes a first lens, a second lens, a third lens, a fourth lens, a fifth lens, a sixth lens, and a seventh lens disposed sequentially from an object side. The optical imaging system satisfies $-2.0 < L3R2/f < -0.5$ and $3.0 < f/IMG\_HT < 4.0$, where L3R2 is a radius of curvature of an image-side surface of the third lens, f is a focal length of the optical imaging system, and IMG_HT is half a diagonal length of an imaging plane.

The optical imaging system may include a prism disposed on an object-side surface of the first lens.

The optical imaging system may satisfy $2.0 < PTTL/f < 3.0$, where PTTL is a distance from a reflective surface of the prism to the imaging plane.

The optical imaging system may satisfy $-1.0 < (L3R1+L3R2)/(L3R1-L3R2) < -0.1$, where L3R1 is a radius of curvature of an object-side surface of the third lens.

The optical imaging system may satisfy $0.10 < f/f1 < 0.80$, $1.0 < f/f3 < 3.0$, $-2.0 < f/f4 < -0.50$, and $0.20 < f/f5 < 0.13$, where f1 is a focal length of the first lens, f3 is a focal length of the third lens, f4 is a focal length of the fourth lens, and f5 is a focal length of the fifth lens.

The optical imaging system may include a first lens group including the first lens and the second lens; a second lens group including the third to fifth lenses and configured to adjust an optical axis distance from the first lens group; and a third lens group comprising the sixth lens and the seven lens.

The optical imaging system may satisfy $-20$ mm $< fG1 < -13$ mm, $5.0$ mm $< fG2 < 10$ mm, and $-24$ mm $< fG3 < -16$ mm, where fG1 is a composite focal length of the first lens group, fG2 is a composite focal length of the second lens group, and fG3 is a composite focal length of the third lens group.

An image-side surface of the first lens may be concave.

The fifth lens may have positive refractive power.

An object-side surface of the seventh lens may be concave.

In another general aspect, an optical imaging system includes a first lens having a concave image-side surface; a second lens having negative refractive power; a third lens having a convex object-side surface and a convex image-side surface; a fourth lens having a concave image-side surface; a fifth lens having positive refractive power; a sixth lens having positive refractive power and a concave object-side surface; and a seventh lens having a concave object-side surface, wherein the first to seventh lenses are sequentially disposed from an object side.

The optical imaging system may satisfy $0.4 < BFL/2IMG\_HT < 0.6$, where BFL is a distance from an image-side surface of the seventh lens to an imaging plane, and 2IMG_HT is a diagonal length of the imaging plane.

The optical imaging system of claim 11, wherein $1.8 < TTL/f < 2.0$, where TTL is a distance from an object-side surface of the first lens to an imaging plane, and f is a focal length of the optical imaging system.

In another general aspect, an optical imaging system includes a first lens group including two or more lenses having refractive powers of different signs and disposed such that a distance to an imaging plane is constant; a second lens group including three or more lenses, each lens having refractive power of a sign opposite to a sign of an adjacent lens, and configured to move along an optical axis; and a third lens group including two or more lenses having refractive powers of different signs and configured to move along the optical axis.

The first lens group may include a first lens having positive refractive power and a second lens having negative refractive power, and the second lens group may include a third lens having positive refractive power.

The optical imaging system may satisfy $-1.5 < fG1/Dsum < -1.2$, $0.5 < fG2/Dsum < 0.7$, and $-1.7 < fG3/Dsum < -1.4$, where fG1 is a focal length of the first lens group, fG2 is a focal length of the second lens group, fG3 is a focal length of the third lens group, and Dsum is a sum of a distance from an image-side surface of the first lens group to an object-side surface of the second lens group, a distance from an image-side surface of the second lens group to an object-side surface of the third lens group, and a distance from an image-side surface of the third lens group to the imaging plane.

A portable electronic device may include three or more camera modules, wherein an optical axis of a first camera module is formed in a different direction from an optical axis of a second camera module and an optical axis of a third camera module, and the image sensor may be configured to convert light incident through the first to fifth lenses to an electrical signal.

The first camera module may have the narrowest angle of view and the longest focal length, the third camera module may have the widest angle of view and the shortest focal length, and the second camera module may have a wider angle of view than the first camera module and a narrower angle of view than the third camera module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
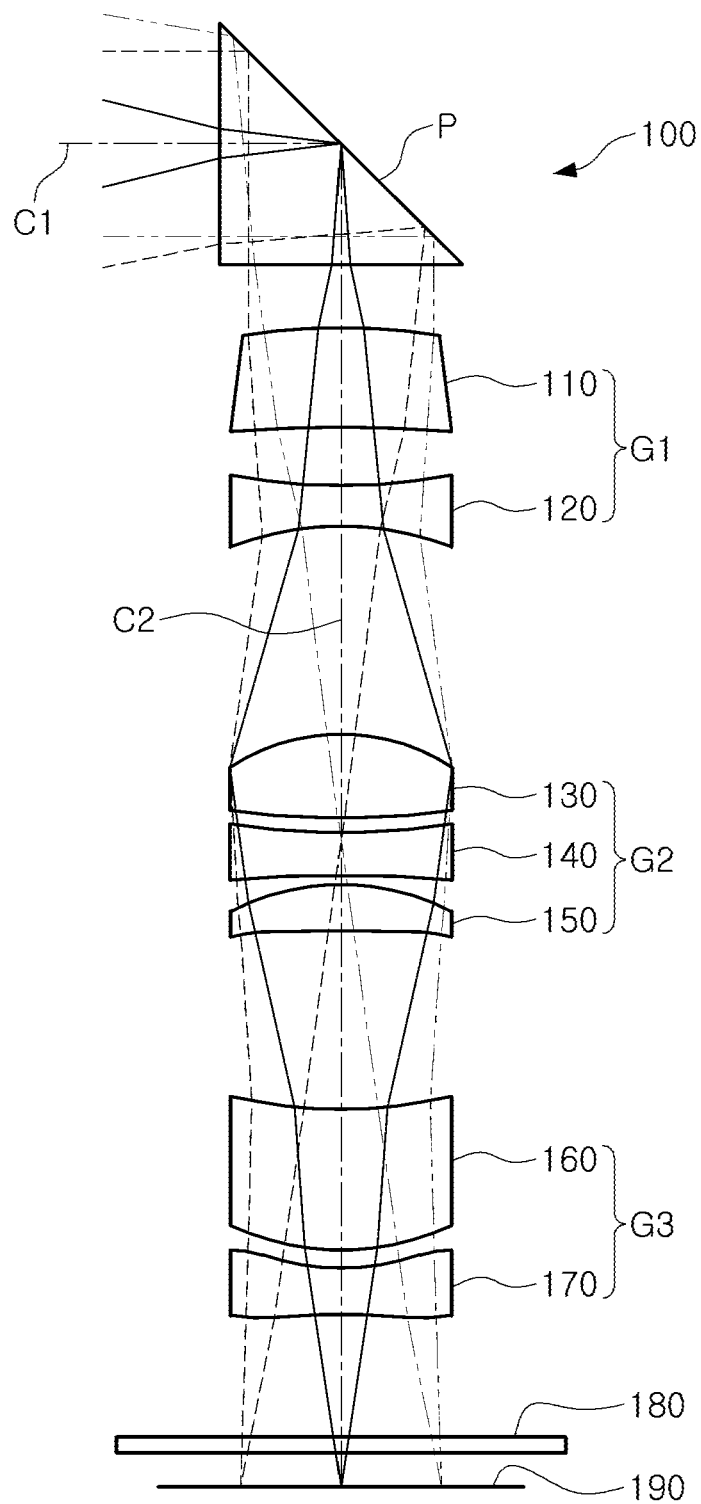
FIG. 1 illustrates a configuration of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has"

specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In the examples, a first lens refers to a lens most adjacent to an object, and a seventh lens refers to a lens most adjacent to an image-side surface (or an image sensor). In the examples, a unit of a radius of curvature, a thickness, a distance from an object-side surface to an image-side surface of a first lens (TTL), a half of a diagonal length of an image-side surface (IMG HT), and a focal length are indicated in millimeters (mm). A thickness of a lens, a gap between lenses, and a TTL refer to a distance of a lens taken in an optical axis direction. Also, in the descriptions of a shape of a lens, a configuration in which one surface is convex indicates that a paraxial region of the surface is convex, and a configuration in which one surface is concave indicates that a paraxial region of the surface is concave. Thus, even when one surface of a lens is described as being convex, an edge of the lens may be concave. Similarly, even when one surface of a lens is described as being concave, an edge of the lens may be convex.

An optical imaging system includes an optical system including a plurality of lenses. For example, the optical system of the optical imaging system may include lenses having refractive power. However, the optical imaging system is not limited to including only the lenses having refractive power. For example, the optical imaging system may include a prism, refracting incident light, and a stop for controlling the amount of light. In addition, the optical imaging system may include an infrared cut-off filter for cutting off infrared light. The optical imaging system may further include an image sensor (for example, an imaging device) for converting an image of a subject, incident thereto through the optical system, into an electrical signal. The optical imaging system may further include a gap maintaining member for adjusting a gap between lenses.

The lenses are formed of a material having a refractive index different from a refractive index of air. For example, the lenses are formed of plastic or glass. At least one of the lenses has an aspherical shape. An aspherical surface of each of the lenses is represented by Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$

In Equation 1, c denotes an inverse of a radius of curvature of a corresponding lens, k denotes a conic constant, r denotes a distance from a certain point on an aspherical surface of the lens to an optical axis, A to J denote aspherical constants, and Z (or SAG) denotes a height in an optical axis direction from the certain point on the aspherical surface to a vertex of the aspherical surface.

The optical imaging system includes a plurality of lens groups. For example, the optical imaging system may include a first lens group, a second lens group, and third lens group. The first lens group, the second lens group, and the third lens group are sequentially disposed in an optical axis.

The first lens group includes a plurality of lenses. For example, the first lens group may include a plurality of lenses having reflective powers having signs opposite to each other. As an example, the first lens group includes a lens having negative refractive power and a lens having positive refractive power. The first lens group may have negative refractive power overall.

The second lens group includes a plurality of lenses. For example, the second lens group includes three lenses. The three lenses may be arranged to have refractive power having of a sign opposite to a sign of an adjacent lens. For example, the second lens group may include a lens having positive refractive power, a lens having negative refractive power, and a lens having positive refractive power. The second lens group has positive refractive power overall.

The third lens group includes a plurality of lenses. For example, the third lens group may include a plurality of lenses having refractive powers having signs opposite to each other. As an example, the third lens group includes a lens having positive refractive power and a lens having negative refractive power. The third lens group has negative refractive power overall.

The first lens group to the third lens group may be moved in an optical axis direction. For example, at least one of the first to third lens groups may be moved to change a focal length of the optical imaging system, and at least two of the first to third lens groups may be moved to adjust a focus of the optical imaging system. Therefore, the optical imaging system may significantly change a zoom ratio. In addition, since the plurality of lens groups of the optical imaging system operate to adjust a focus, the focus may be precisely and accurately adjusted in any zoom state and a displacement width of the lens group for focus adjustment may be significantly reduced.

The optical imaging system includes a lens formed of plastic. For example, among seven or more lenses constituting a lens group, at least one lens may be formed of plastic.

The optical imaging system includes an aspherical lens. For example, among seven or more lenses constituting a lens group, at least one lens may include an aspherical lens.

The optical imaging system includes a member configured to fold or refract an optical path. For example, the optical imaging system may include a prism. The prism is arranged on an object side of the first lens group. The prism may be generally formed of a material having a low Abbe number. For example, the prism may be selected from materials, each having an Abbe number of 25 or less.

The optical imaging system includes a filter, a stop, and an image sensor.

The filter is disposed between the third lens group and the image sensor. The filter may cut off a portion of wavelengths from incident light to improve a resolution of the optical imaging system. For example, the filter may cut off an infrared wavelength of the incident light. The stop is disposed between the first lens group and the second lens group.

The optical imaging system may satisfy one or more conditional expressions among the following Conditional Expressions.

$-2.0 < L3R2/f < -0.5$   Conditional Expression:

$-1.0 < (L3R1+L3R2)/(L3R1-L3R2) < -0.1$   Conditional Expression:

$-1.5 < L6R2/f < -0.4$   Conditional Expression:

$1.0 < (L6R1+L6R2)/(L6R1-L6R2) < 5.0$   Conditional Expression:

$0.1 < f/f1 < 0.8$   Conditional Expression:

$1.0 < f/f3 < 3.0$   Conditional Expression:

$-2.0 < f/f4 < -0.5$   Conditional Expression:

$0.2 < f/f5 < 2.0$   Conditional Expression:

$0.11 < Nd6-Nd7 < 0.13$   Conditional Expression:

In the Conditional Expressions above, L3R1 denotes a radius of curvature of an object-side surface of the third lens, L3R2 denotes a radius of curvature of an image-side surface of the third lens, L6R1 denotes a radius of curvature of an object side of the sixth lens, and L6R2 denotes a radius of curvature of an image-side surface of the sixth lens, f denotes a focal length of the optical imaging system, f1 denotes a focal length of the first lens, f3 denotes a focal length of the third lens, f4 denotes a focal length of the fourth lens, and f5 denotes a focal length of the five lenses, Nd6 denotes a refractive index of the sixth lens, and Nd7 denotes a refractive index of the seventh lens.

Additionally, the optical imaging system may further satisfy one or more conditional expressions, among Conditional Expressions below.

$0.70 \leq L1S1es/L1S1el < 1.0$   Conditional Expression:

$0.70 \leq L1S2es/L1S2el < 1.0$   conditional Expression:

$0.70 \leq L2S1es/L2S1el < 1.0$   Conditional Expression:

$0.70 \leq L2S2es/L2S2el < 1.0$   Conditional Expression:

$1.4\text{ mm} < DPL1 < 2.4\text{ mm}$   Conditional Expression:

$26\text{ mm} < PTTL < 34\text{ mm}$   Conditional Expression:

$0.7 \leq SPY2/SPX2 < 1.0$   Conditional Expression:

$0.7 < L1S1el/IMG\_HT < 0.9$   Conditional Expression:

$0.08 < L1S1el/PTTL < 0.10$   Conditional Expression:

$0.06 < L1S1es/PTTL < 0.08$   Conditional Expression:

$0.06 < L2S1el/PTTL < 0.09$   Conditional Expression:

$0.04 < L2S1es/PTTL < 0.07$   Conditional Expression:

$0.01 < AL1/(PTTL)^2 < 0.03$   Conditional Expression:

$80° < 2\theta < 92°$   Conditional Expression:

$0.4 < BFL/2IMG\_HT < 0.6$   Conditional Expression:

$-20\text{ mm} < fG1 < -13\text{ mm}$   Conditional Expression:

$5.0\text{ mm} < fG2 < 10\text{ mm}$   Conditional Expression:

$-24\text{ mm} < fG3 < -16\text{ mm}$   Conditional Expression:

In the Conditional Expressions above, L1S1es denotes a minor axis effective radius of an object-side surface of the first lens, L1S1el denotes a major axis effective radius of the object-side surface of the first lens, L1S2es denotes a minor axis effective radius of an image-side surface of the first lens, and L1S2el denotes a major axis effective radius of the image-side surface of the first lens, L2S1es denotes a minor axis effective radius of an object-side surface of the second lens, L2S1el denotes a major axis effective radius of the object-side surface of the second lens, and L2S2es denotes a minor axis effective radius of an image-side surface of the second lens, L2S2el denotes a major axis effective radius of the image-side surface of the second lens, DPL1 denotes a distance from an image-side surface of the prism to the object-side surface of the first lens, PTTL denotes a distance from a reflective surface of the prism to an imaging plane, SPY2 denotes a length of a hole, formed in the gap maintaining member, in a minor axis direction, SPX2 denotes a length of the hole, formed in the gap maintaining member, in a major axis direction, AL1 denotes an area in which an effective diameter of the first lens (the object-side surface) is projected to the imaging plane, $2\theta$ denotes an angle formed by a center of an optical axis of a lens and both ends of a linear portion of an effective diameter of the lens, FOV denotes an overall viewing angle of the optical imaging system, BFL denotes a distance from an image-side surface of a lens, closest to the imaging plane, to the imaging plane, fG1 denotes a focal length of the first lens group, fG2 denotes a focal length of the second lens group, and fG3 denotes a focal length of the third lens group. IMG_HT is half a diagonal length of an imaging plane.

Hereinafter, optical imaging systems according to various examples will be described.

An optical imaging system according to a first example will be described with reference to FIG. 1.

An optical imaging system 100 may include a prism P, a first lens 110, a second lens 120, a third lens 130, a fourth lens 140, a fifth lens 150, a six lens 160, and a seventh lens 170, and may be divided into a plurality of lens groups. For example, the optical imaging system 100 may be divided into a first lens group G1, a second lens group G2, and a third lens group G3. The first lens group G1 includes two lenses. For example, the first lens group G1 includes the first lens 110 and the second lens 120. The first lens 110 has a positive refractive power and has a shape in which an object-side surface is convex and an image-side surface is concave. The second lens 120 has negative refractive power and has a shape in which an object-side surface is convex and an image-side surface is concave. The second lens group G2 includes three lenses. For example, the second lens group G2 includes a third lens 130, a fourth lens 140, and a fifth lens 150. The third lens 130 has positive refractive power and has a shape in which an object-side surface is convex and an image-side surface is convex. The fourth lens 140 has negative refractive power and has a shape in which an object-side surface is concave and an image-side surface is concave. The fifth lens 150 has positive refractive power and has a shape in which an object-side surface is convex and an image-side surface is convex. The third lens group G3 includes two lenses. For example, the third lens group G3 includes the sixth lens 160 and the seventh lens 170. The sixth lens 160 has positive refractive power and has a shape in which an object-side surface is concave and an image-side surface is convex. The seventh lens 170 has negative refractive power and has a shape in which an object-side surface is concave and an image-side surface is concave.

The lens groups G1, G2, and G3 are moved in the optical axis direction to change a focal length of the optical imaging system. For example, a distance D1 between the first lens group G1 and the second lens group G2 and a distance D2 between the second lens group G2 and the third lens group G3 may be decreased as the focal length of the optical imaging is increased. Meanwhile, a distance D3 between the third lens group G3 and an imaging plane may be increased as the focal length of the optical imaging system is increased.

Figure 2:
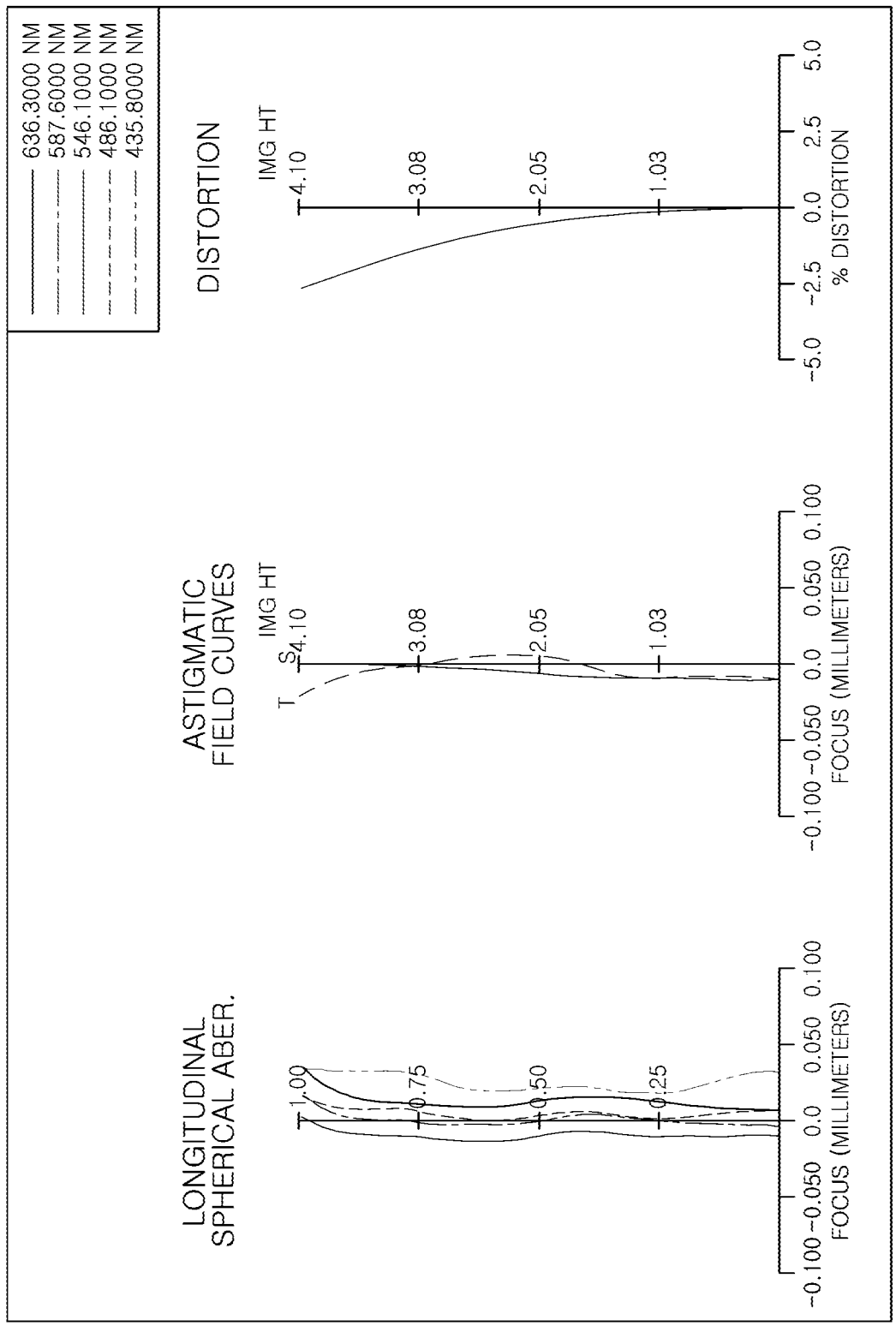
FIG. 2 shows aberration curves in a first zoom position of the optical imaging system illustrated in FIG. 1.
Figure 3:
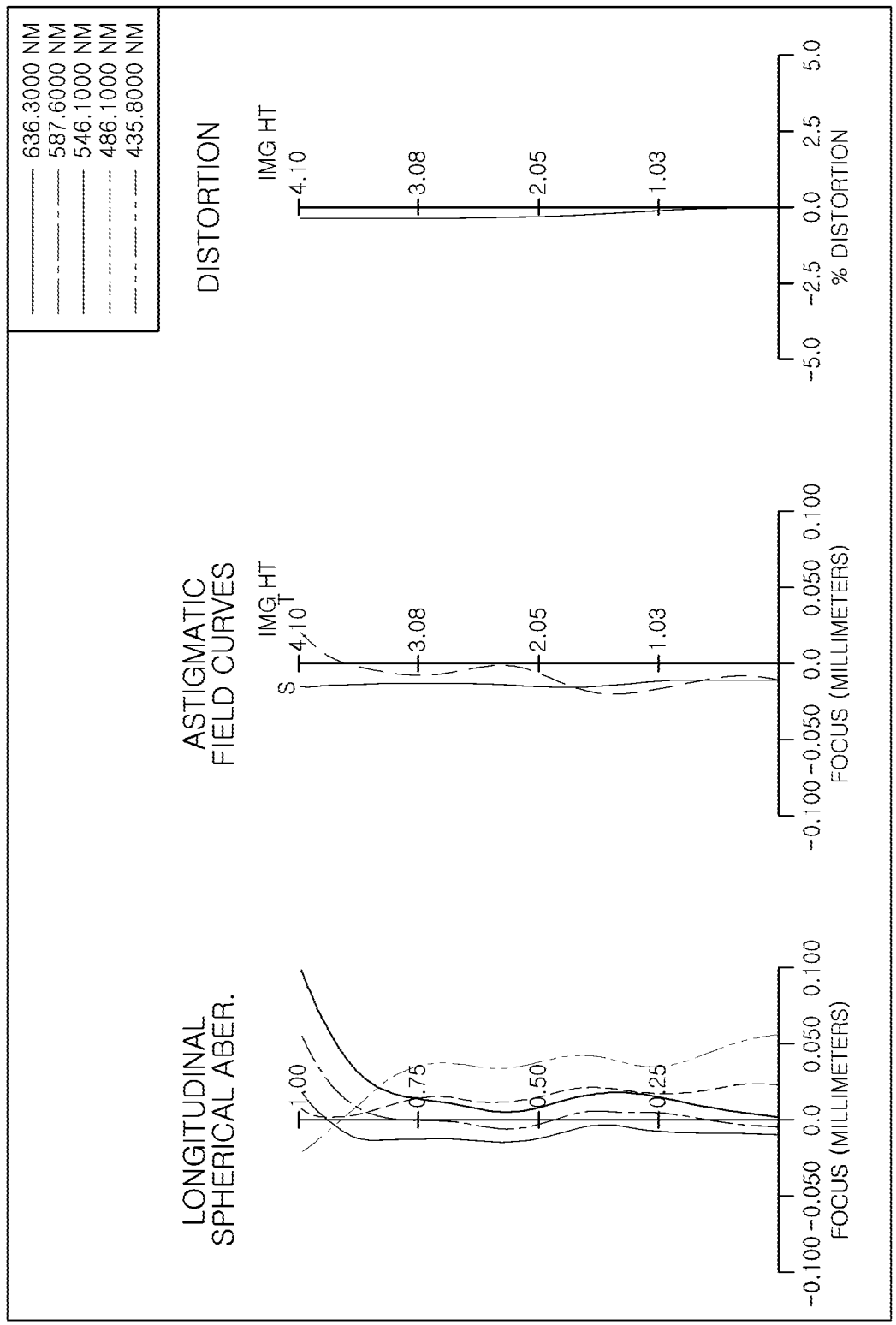
FIG. 3 shows aberration curves in a second zoom position of the optical imaging system illustrated in FIG. 1.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 2 and 3.

The optical imaging system 100 includes a prism P, a stop ST, a filter 180, and an image sensor 190.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 110. The prism P disposed as described above refracts light, reflected from an object (a subject), to the image sensor 190.

The filter 180 is disposed in front of the image sensor 190 to cut off infrared rays, or the like, included in the incident light. The image sensor 190 includes a plurality of optical sensors. The above-configured image sensor 190 is configured to convert an optical signal into an electrical signal.

Table 1 shows lens characteristics of the optical imaging system according to this example, Table 2 shows aspherical values of the optical imaging system according to this example, and Table 3 shows distance values between lens groups depending on a first position and a second position of the optical imaging system.

TABLE 1

| Surface No. | Remark | Radius of Curvature | Thickness/Gap | Focal Length | Refractive Index | Abbe Number |
|---|---|---|---|---|---|---|
| 0 | Object | infinity | infinity | | | |
| 1 | Prism | infinity | 2.7500 | | 1.6349 | 23.900 |
| 2 | | infinity | 2.7500 | | 1.6349 | 23.900 |
| 3 | | infinity | 1.4500 | | | |
| 4* | First | 13.11983 | 2.4000 | 25.1440 | 1.6600 | 20.400 |
| 5* | Lens | 55.33719 | 1.4000 | | | |
| 6* | Second | 79.22416 | 1.0000 | −8.5150 | 1.5676 | 37.300 |
| 7* | Lens | 4.56186 | 0.0000 | | | |
| 8 | Stop | infinity | D1 | | | |
| 9* | Third | 5.00060 | 2.0396 | 7.0690 | 1.5441 | 56.000 |
| 10* | Lens | −14.54475 | 0.2797 | | | |
| 11* | Fourth | −33.94623 | 1.0856 | −8.9790 | 1.6150 | 25.900 |
| 12* | Lens | 6.74849 | 0.1500 | | | |
| 13* | Fifth | 6.52421 | 1.2000 | 10.1290 | 1.5441 | 56.000 |
| 14* | Lens | −34.15570 | D2 | | | |
| 15* | Sixth | −10.78105 | 3.3800 | 20.4060 | 1.6714 | 19.200 |
| 16* | Lens | −6.83464 | 0.4280 | | | |
| 17* | Seventh | −18.68595 | 1.1363 | −10.9270 | 1.5441 | 56.000 |
| 18* | Lens | 8.96586 | D3 | | | |
| 19 | Filter | infinity | 0.3000 | | 1.5167 | 64.100 |
| 20 | | infinity | 0.6958 | | | |
| 21 | Imaging plane | infinity | 0.1209 | | | |

(In Table 1, *marked surfaces are aspherical surfaces)

TABLE 2

| Surface No. | K | A | B | C | D |
|---|---|---|---|---|---|
| 4 | −17.20801686 | 0.001700732 | −4.33E−05 | −1.34E−05 | 5.91E−06 |
| 5 | −99 | 0.001691681 | −0.000150474 | −2.43E−05 | 2.48E−05 |
| 6 | 0 | −0.006863742 | −7.25E−05 | 0.000219949 | −8.05E−05 |
| 7 | 0 | −0.010489527 | 0.000469437 | 0.000245287 | −0.000132566 |
| 9 | 0 | −0.000328224 | −7.12E−05 | 0.00010861 | −4.54E−05 |
| 10 | 0 | −0.003732084 | 0.003523602 | −0.001153936 | 0.00018246 |
| 11 | 0 | −0.009135281 | 0.00741662 | −0.003226869 | 0.000881436 |
| 12 | 0 | −0.020725944 | 0.022153087 | −0.013695274 | 0.005451772 |
| 13 | 0 | −0.015427782 | 0.020174888 | −0.012722338 | 0.005098508 |
| 14 | 0 | 0.002943557 | 0.001383243 | −0.000824749 | 0.000285009 |
| 15 | 0 | 0.002081062 | −0.000261606 | 0.000118719 | −7.62E−05 |
| 16 | 0 | −0.007427565 | 0.003771083 | −0.000868256 | 0.000100431 |
| 17 | 0 | −0.031134906 | 0.009448114 | −0.001715307 | 0.000103008 |
| 18 | 0 | −0.021012308 | 0.005710653 | −0.001332883 | 0.000243879 |

TABLE 2-continued

| Surface No. | E | F | G | H | I |
|---|---|---|---|---|---|
| 4 | −1.24E−06 | 1.53E−07 | −1.14E−08 | 4.66E−10 | |
| 5 | −8.68E−06 | 1.68E−06 | −1.89E−07 | 1.17E−08 | −3.04E−10 |
| 6 | 1.58E−05 | −1.80E−06 | 9.51E−08 | 6.24E−10 | −2.05E−10 |
| 7 | 3.69E−05 | −6.55E−06 | 7.31E−07 | −4.64E−08 | 1.27E−09 |
| 9 | 1.00E−05 | −1.29E−06 | 9.89E−08 | −4.31E−09 | 8.14E−11 |
| 10 | −1.45E−05 | 1.06E−06 | −1.61E−07 | 1.50E−08 | −4.90E−10 |
| 11 | −0.0001745 | 2.64E−05 | −2.81E−06 | 1.77E−07 | −4.77E−09 |
| 12 | −0.001435453 | 0.000247054 | −2.65E−05 | 1.59E−06 | −4.08E−08 |
| 13 | −0.001325182 | 0.000221292 | −2.27E−05 | 1.30E−06 | −3.17E−08 |
| 14 | −3.77E−05 | −4.93E−06 | 2.33E−06 | −2.87E−07 | 1.22E−08 |
| 15 | 2.40E−05 | −4.45E−06 | 4.86E−07 | −2.93E−08 | 7.47E−10 |
| 16 | −3.22E−06 | −6.17E−07 | 8.51E−08 | −4.35E−09 | 8.31E−11 |
| 17 | 2.40E−05 | −6.09E−06 | 6.10E−07 | −3.03E−08 | 6.10E−10 |
| 18 | −3.37E−05 | 3.41E−06 | −2.37E−07 | 9.95E−09 | 1.87E−10 |

TABLE 3

| Note | First Position | Second Position |
|---|---|---|
| D1 | 4.98204 | 1.20000 |
| D2 | 4.22285 | 4.80000 |
| D3 | 3.00000 | 6.20000 |

Figure 4:
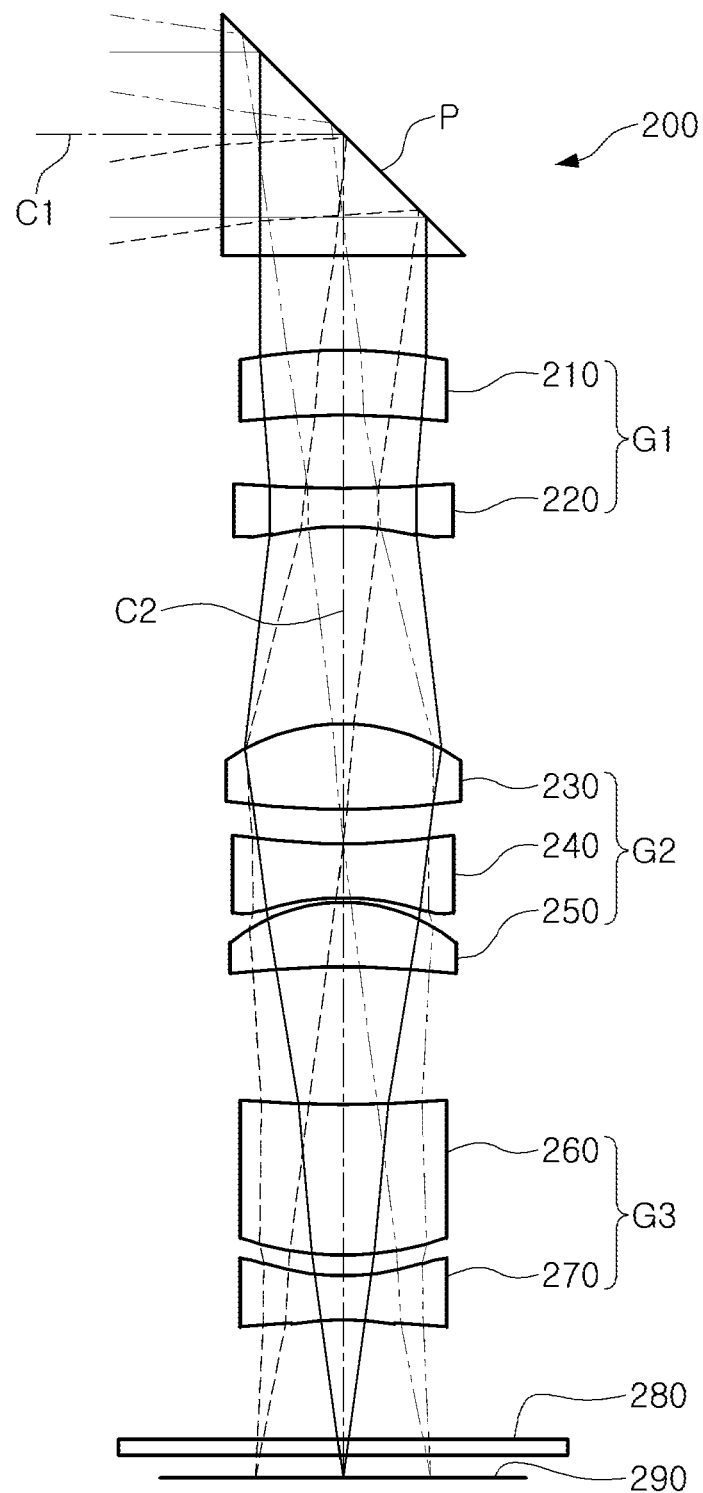
FIG. 4 illustrates a configuration of an optical imaging system according to a second example.

An optical imaging system according to a second example will be described with reference to FIG. 4.

The optical imaging system 200 may include a prism P, a first lens 210, a second lens 220, a third lens 230, a fourth lens 240, a fifth lens 250, a six lens 260, a seventh lens 270, and may be divided into a plurality of lens groups. For example, the optical imaging system 200 may be divided into a first lens group G1, a second lens group G2, and a third lens group G3. The first lens group G1 includes two lenses. For example, the first lens group G1 includes a first lens 210 and a second lens 220. The first lens 210 has positive refractive power and has a shape in which an object-side surface is convex and the image-side surface is concave. The second lens 220 has negative refractive power and has a shape in which an object-side surface is convex and an image-side surface is concave. The second lens group G2 includes three lenses. For example, the second lens group G2 includes a third lens 230, a fourth lens 240, and a fifth lens 250. The third lens 230 has positive refractive power and has a shape in which an object-side surface is convex and an image-side surface is convex. The fourth lens 240 has negative refractive power and has a shape in which an object-side surface is concave and an image-side surface is concave. The fifth lens 250 has positive refractive power and has a shape in which an object-side surface is convex and an image-side surface is convex. The third lens group G3 includes two lenses. For example, the third lens group G3 includes a sixth lens 260 and a seventh lens 270. The sixth lens 260 has positive refractive power and has a shape in which an object-side surface is concave and an image-side surface is convex. The seventh lens 270 has a negative refractive power and has a shape in which an object-side surface is concave and an image-side surface is concave.

The lens groups G1, G2, and G3 are moved in an optical axis direction to change a focal length of the optical imaging system. For example, a distance D1 between the first lens group G1 and the second lens group G2 and a distance D2 between the second lens group G2 and the third lens group G3 may be decreased as a focal length of the optical imaging system is increased. Meanwhile, a distance D3 between the third lens group G3 and an imaging plane may be increased as the focal length of the optical imaging system is increased.

Figure 5:
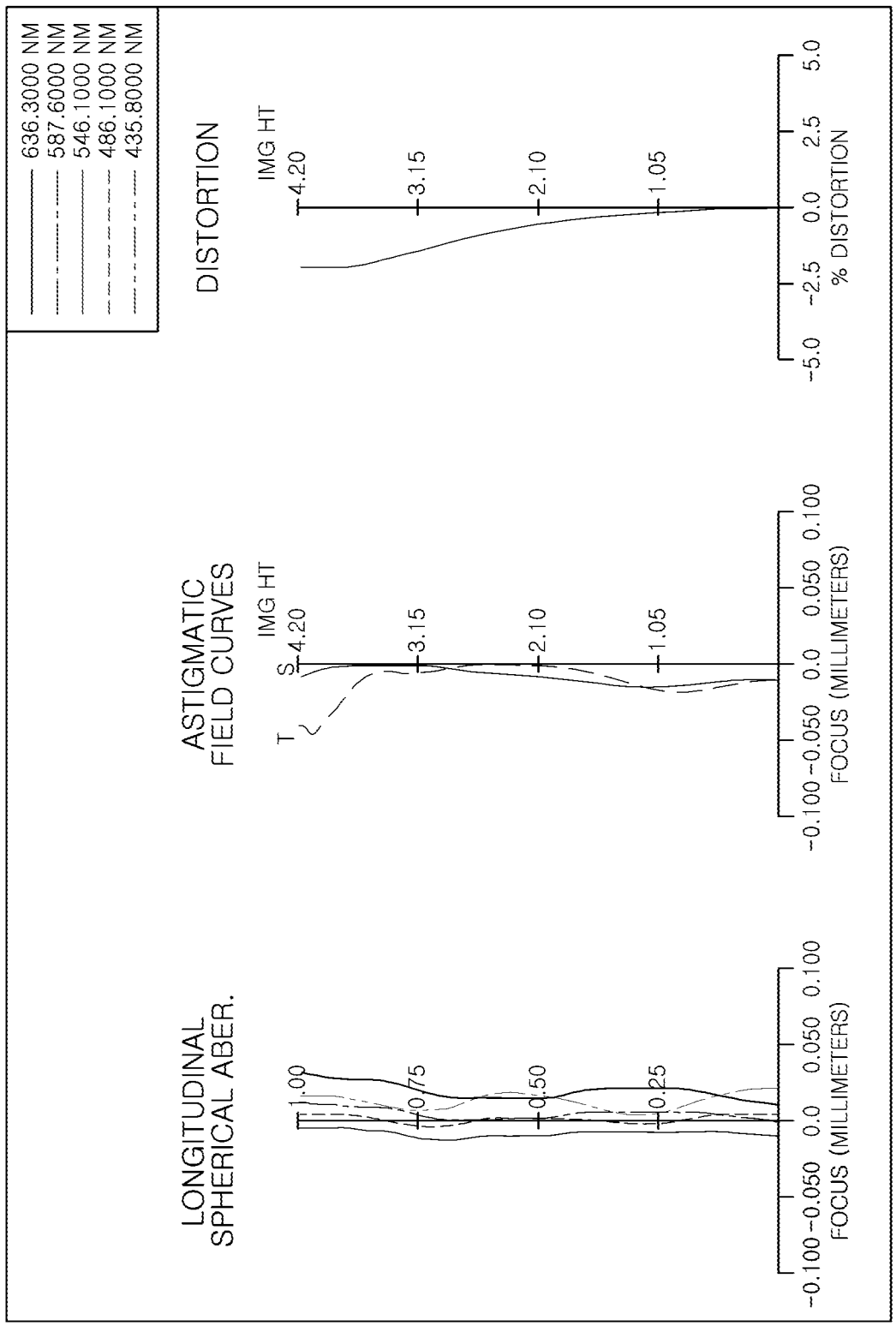
FIG. 5 shows aberration curves in a first zoom position of the optical imaging system illustrated in FIG. 4.
Figure 6:
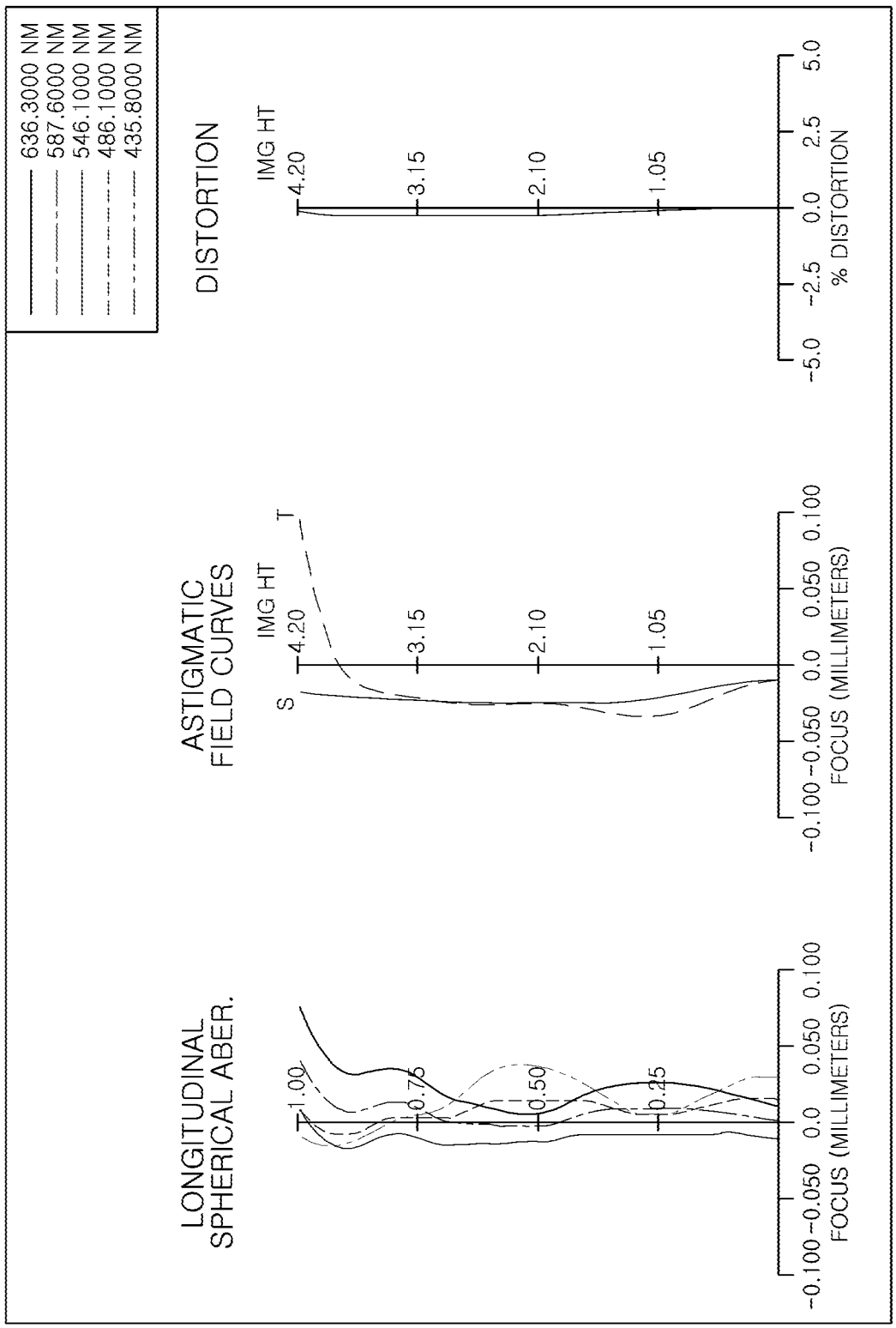
FIG. 6 shows aberration curves in a second zoom position of the optical imaging system illustrated in FIG. 4.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 5 and 6.

The optical imaging system 200 includes a prism P, a stop ST, a filter 280, and an image sensor 290.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 210. The prism P disposed as described above refracts light, reflected from an object (a subject), to the image sensor 290.

The filter 280 is disposed in front of the image sensor 190 to cut off infrared rays, or the like, included in the incident light. The image sensor 290 includes a plurality of optical sensors. The above-configured image sensor 290 is configured to convert an optical signal into an electrical signal.

Table 4 shows lens characteristics of the optical imaging system according to this example, Table 5 shows aspherical values of the optical imaging system according to this example, and Table 6 shows distance values between lens groups depending on a first position and a second position of the optical imaging system.

TABLE 4

| Surface No. | Remark | Radius of Curvature | Thickness/Gap | Focal Length | Refractive Index | Abbe Number |
|---|---|---|---|---|---|---|
| 0 | Object | infinity | infinity | | | |
| 1 | Prism | infinity | 3.2000 | | 1.6349 | 23.900 |

TABLE 4-continued

| Surface No. | Remark | Radius of Curvature | Thickness/Gap | Focal Length | Refractive Index | Abbe Number |
|---|---|---|---|---|---|---|
| 2 | | infinity | 3.2000 | | 1.6349 | 23.900 |
| 3 | | infinity | 2.0000 | | | |
| 4* | First Lens | 13.85474 | 1.8960 | 26.0690 | 1.6714 | 19.200 |
| 5* | | 60.07426 | 1.4000 | | | |
| 6* | Second Lens | 34.36276 | 0.9540 | −8.9060 | 1.5676 | 37.300 |
| 7* | | 4.38641 | 0.0000 | | | |
| 8 | Stop | infinity | D1 | | | |
| 9* | Third Lens | 5.18060 | 2.0000 | 7.3700 | 1.5441 | 56.000 |
| 10* | | −15.63158 | 0.5556 | | | |
| 11* | Fourth Lens | −66.15421 | 0.7228 | −8.4720 | 1.6150 | 25.900 |
| 12* | | 5.73575 | 0.1500 | | | |
| 13* | Fifth Lens | 5.96723 | 1.2000 | 9.4670 | 1.5441 | 56.000 |
| 14* | | −36.14445 | D2 | | | |
| 15* | Sixth Lens | −17.61801 | 3.3800 | 18.8840 | 1.6714 | 19.200 |
| 16* | | −8.00066 | 0.6000 | | | |
| 17* | Seventh Lens | −12.72177 | 1.2000 | −9.9370 | 1.5441 | 56.000 |
| 18* | | 9.79121 | D3 | | | |
| 19 | Filter | infinity | 0.2100 | | 1.5167 | 64.100 |
| 20 | | infinity | 0.6555 | | | |
| 21 | Imaging plane | infinity | 0.1800 | | | |

(In Table 4, *marked surfaces are aspherical surfaces)

TABLE 5

| Surface No. | K | A | B | C | D |
|---|---|---|---|---|---|
| 4 | 16.14177782 | 0.001762085 | −3.32E−05 | −1.67E−05 | 6.12E−06 |
| 5 | −99 | 0.001967089 | −6.93E−05 | −7.46E−05 | 3.83E−05 |
| 6 | 0 | 0.007277943 | 0.000214376 | 0.00017835 | −8.46E−05 |
| 7 | 0 | −0.011327878 | 0.000578359 | 0.000247897 | −1.61E−04 |
| 9 | 0 | −0.000540313 | 0.000171393 | −3.43E−05 | 4.08E−06 |
| 10 | 0 | −0.002665773 | 0.003318416 | −0.001346635 | 2.87E−04 |
| 11 | 0 | −0.014006023 | 0.013749257 | −0.006988073 | 0.002040855 |
| 12 | 0 | −0.029127707 | 0.032145691 | −0.017844204 | 0.005533008 |
| 13 | 0 | −0.016797476 | 0.022894938 | −0.012778763 | 0.003932575 |
| 14 | 0 | 0.003706174 | 0.000882219 | −0.000713129 | 0.000370418 |
| 15 | 0 | 0.001735256 | −0.000326231 | 0.000188563 | −0.000100624 |
| 16 | 0 | −0.003688312 | 0.001530866 | −0.00011221 | −4.51E−05 |
| 17 | 0 | −0.022332799 | 0.005513251 | 0.000472961 | −0.00011116 |
| 18 | 0 | −0.017010848 | 0.004618559 | −0.001142766 | 0.00025807 |

| Surface No. | E | F | G | H | I |
|---|---|---|---|---|---|
| 4 | −1.23E−06 | 1.51E−07 | −1.13E−08 | 4.74E−10 | −8.40E−12 |
| 5 | −1.09E−05 | 1.88E−06 | −1.95E−07 | 1.11E−08 | −2.70E−10 |
| 6 | 2.16E−05 | −3.38E−06 | 3.23E−07 | −1.71E−08 | 3.83E−10 |
| 7 | 5.15E−05 | −1.01E−05 | 1.22E−06 | −8.30E−08 | 2.43E−09 |
| 9 | −9.24E−07 | 2.80E−07 | −3.93E−08 | 2.45E−09 | −5.68E−11 |
| 10 | −3.45E−05 | 2.56E−06 | −1.42E−07 | 6.64E−09 | −1.71E−10 |
| 11 | −0.000366956 | 4.26E−05 | −3.24E−06 | 1.53E−07 | −3.44E−09 |
| 12 | −0.001014555 | 0.000113559 | −7.80E−06 | 3.15E−07 | −6.03E−09 |
| 13 | −0.000711386 | 7.76E−05 | −5.01E−06 | 1.78E−07 | −2.76E−09 |
| 14 | −0.000129539 | 2.91E−05 | −3.95E−06 | 2.93E−07 | −9.19E−09 |
| 15 | 2.84E−05 | −5.01E−06 | 5.47E−07 | −3.46E−08 | 9.62E−10 |
| 16 | 1.12E−05 | −1.08E−06 | 5.03E−08 | −9.90E−10 | 3.97E−12 |
| 17 | 3.68E−05 | −4.56E−06 | 3.03E−07 | −1.10E−08 | 1.78E−10 |
| 18 | −4.92E−05 | 6.91E−06 | −6.31E−07 | 3.27E−08 | −7.32E−10 |

TABLE 6

| Note | First Position | Second Position |
|---|---|---|
| D1 | 4.96087 | 1.20000 |
| D2 | 4.1752 | 4.7311 |
| D3 | 3.00000 | 6.20000 |

Figure 7:
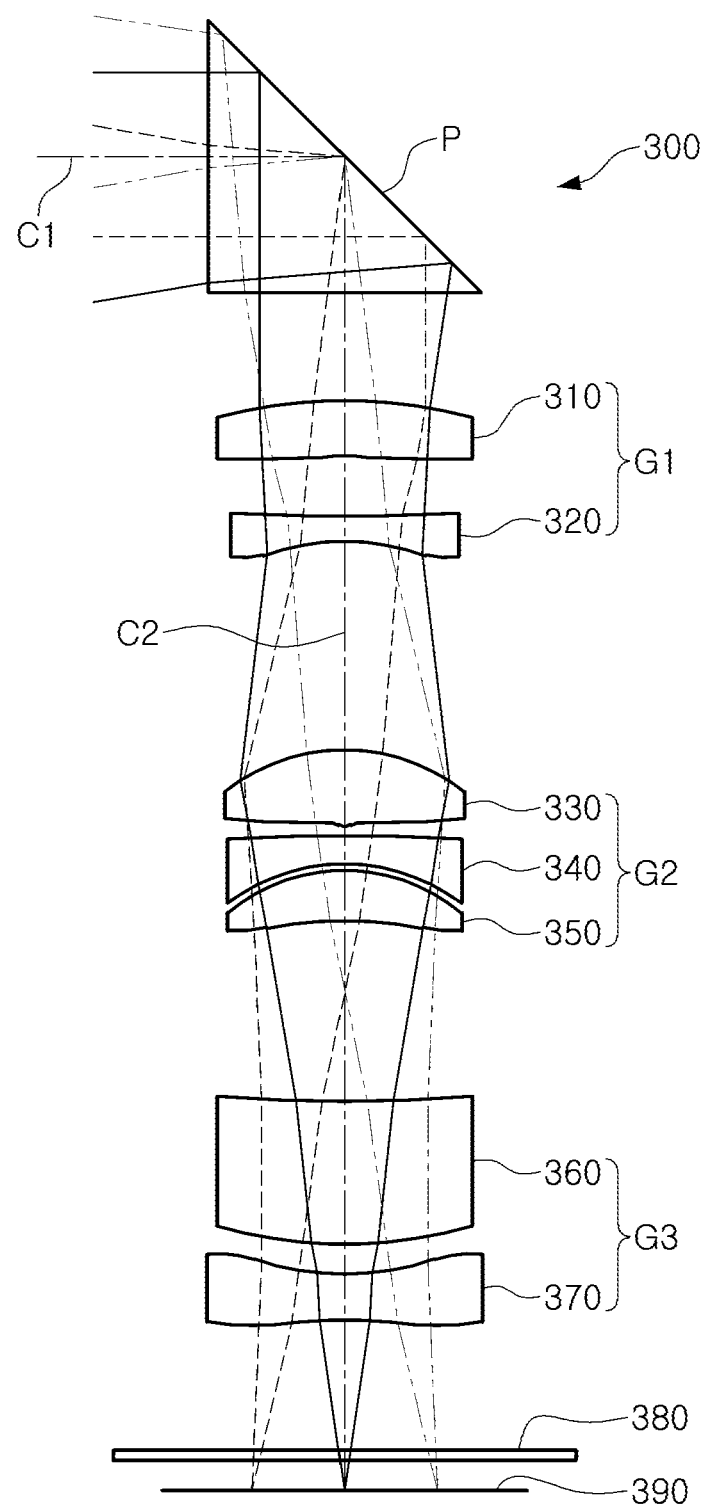
FIG. 7 illustrates a configuration of an optical imaging system according to a third example.

The optical system according to a third example will be described with reference to FIG. 7.

An optical imaging system 300 may include a prism P, a first lens 310, a second lens 320, a third lens 330, a fourth lens 340, a fifth lens 350, a sixth lens 360, and a seventh lens 370 and may be divided into a plurality of lens groups. For example, the optical imaging system 300 may be divided into a first lens group G1, a second lens group G2, and a third lens group G3. The first lens group G1 includes two lenses.

For example, the first lens group G1 includes a first lens 310 and a second lens 320. The first lens 310 has positive refractive power and has a shape in which an object-side surface is convex and an image-side surface is concave. The second lens 320 has negative refractive power and has a shape in which an object-side surface is convex and an image-side surface is concave. The second lens group G2 includes three lenses. For example, the second lens group G2 includes a third lens 330, a fourth lens 340, and a fifth lens 350. The third lens 330 has positive refractive power and has a shape in which an object-side surface is convex and an image-side surface is convex. The fourth lens 340 has negative refractive power and has a shape in which an object-side surface is concave and an image-side surface is concave. The fifth lens 350 has positive refractive power and has a shape in which an object-side surface is convex and an image-side surface is concave. The third lens group G3 includes two lenses. For example, the third lens group G3 includes a sixth lens 360 and a seventh lens 370. The sixth lens 360 has positive refractive power and has a shape in which an object-side surface is concave and an image-side surface is convex. The seventh lens 370 has negative refractive power and has a shape in which an object-side surface is concave and an image-side surface is concave.

The lens groups G1, G2, and G3 are moved in an optical axis direction to change a focal length of the optical imaging system. For example, a distance D1 between the first lens group G1 and the second lens group G2 and a distance D2 between the second lens group G2 and the third lens group G3 may be decreased as a focal length of the optical imaging system is increased. Meanwhile, a distance D3 between the third lens group G3 and an imaging plane may be increased as the focal length of the optical imaging system is increased.

Figure 8:
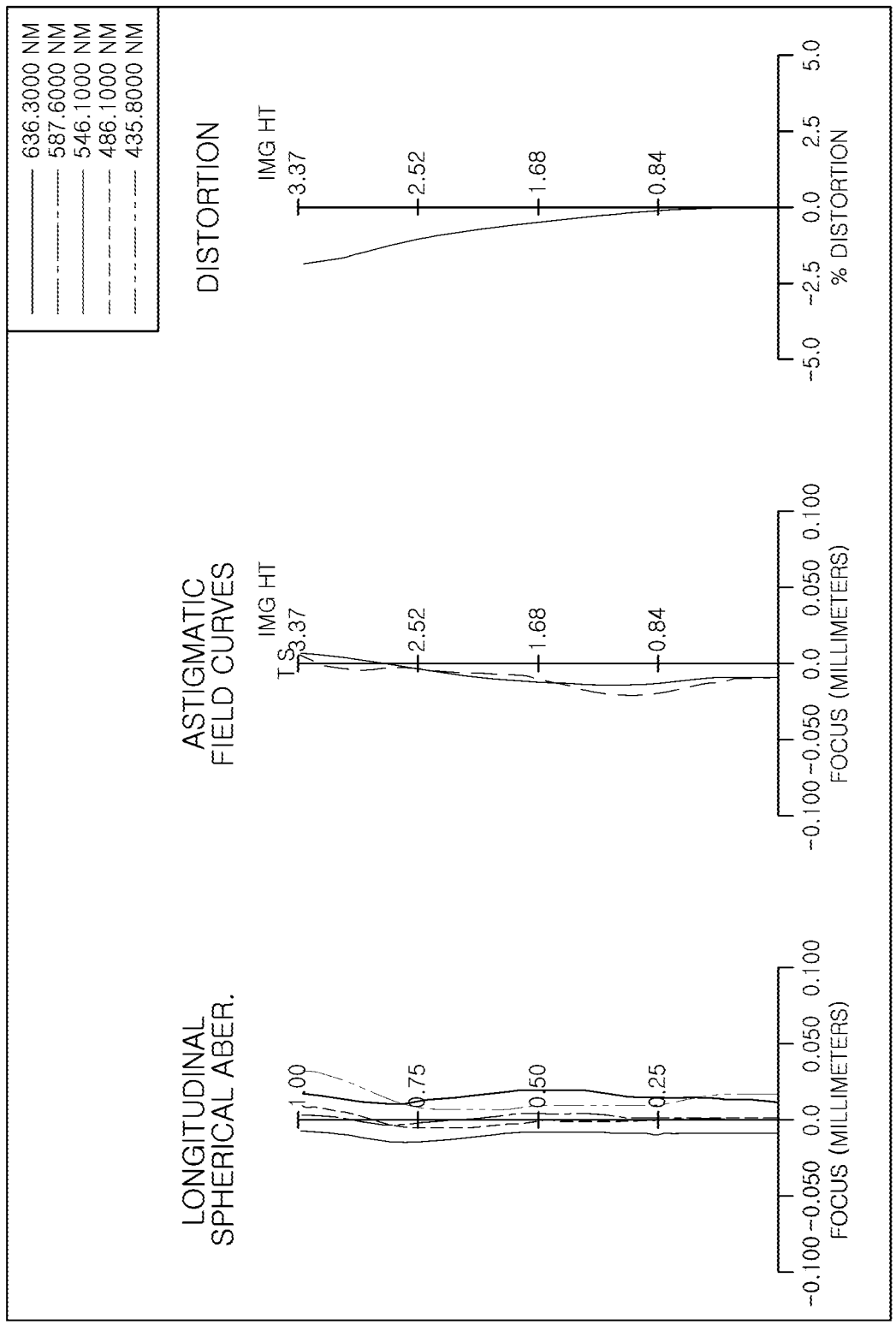
FIG. 8 shows aberration curves in a first zoom position of the optical imaging system illustrated in FIG. 7.
Figure 9:
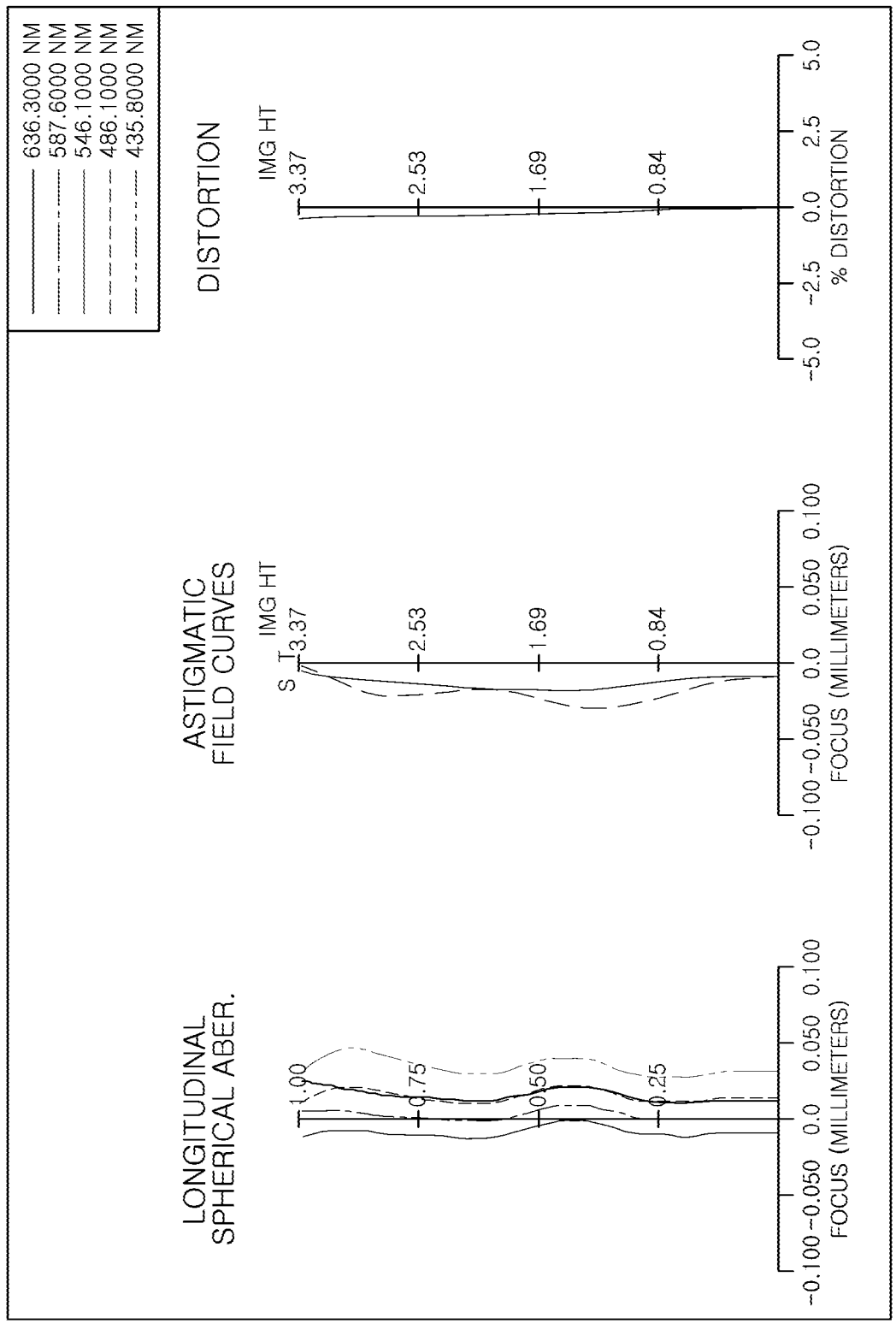
FIG. 9 shows aberration curves in a second zoom position of the optical imaging system illustrated in FIG. 7.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 8 and 9.

The optical imaging system 300 includes a prism P, a stop ST, a filter 380, and an image sensor 390.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 310. The prism P disposed as described above refracts light, reflected from an object (a subject), to the image sensor 390.

The filter 380 is disposed in front of the image sensor 390 to cut off infrared rays, or the like, included in the incident light. The image sensor 390 includes a plurality of optical sensors. The above-configured image sensor 390 is configured to convert an optical signal into an electrical signal.

Table 7 shows lens characteristics of the optical imaging system according to this example, Table 8 shows aspherical values of the optical imaging system according to this example, and Table 9 shows distance values between lens groups depending on a first position and a second position of the optical imaging system.

TABLE 7

| Surface No. | Remark | Radius of Curvature | Thickness/Gap | Focal Length | Refractive Index | Abbe Number |
|---|---|---|---|---|---|---|
| 0 | Object | infinity | infinity | | | |
| 1 | Prism | infinity | 2.9216 | | 1.6349 | 23.900 |
| 2 | | infinity | 2.9216 | | 1.6349 | 23.900 |
| 3 | | infinity | 2.2825 | | | |
| 4* | First Lens | 12.23156 | 1.2445 | 20.4720 | 1.6600 | 20.400 |
| 5* | | 110.13461 | 1.2782 | | | |
| 6* | Second | 52.70986 | 0.5478 | −7.8030 | 1.5676 | 37.300 |
| 7* | Lens | 4.09419 | 0.0000 | | | |
| 8 | Stop | infinity | D1 | | | |
| 9* | Third Lens | 4.24836 | 1.5704 | 6.7050 | 1.5441 | 56.000 |
| 10* | | −23.19294 | 0.2684 | | | |
| 11* | Fourth | 44.40735 | 0.5935 | −8.2120 | 1.6150 | 25.900 |
| 12* | Lens | 4.54875 | 0.1369 | | | |
| 13* | Fifth Lens | 4.39658 | 1.0956 | 9.4520 | 1.5441 | 56.000 |
| 14* | | 26.92320 | D2 | | | |
| 15* | Sixth Lens | −25.46722 | 3.0859 | 24.5940 | 1.6714 | 19.200 |
| 16* | | −10.58515 | 0.6635 | | | |
| 17* | Seventh | −13.88713 | 1.0264 | −10.5500 | 1.5441 | 56.000 |
| 18* | Lens | 10.11645 | D3 | | | |
| 19 | Filter | infinity | 0.2100 | | 1.5167 | 64.100 |
| 20 | | infinity | 0.5025 | | | |
| 21 | Imaging plane | infinity | 0.1523 | | | |

(In Table 7, *marked surfaces are aspherical surfaces)

TABLE 8

| Surface No. | K | A | B | C | D |
|---|---|---|---|---|---|
| 4 | −14.3321767 | 0.003005439 | −0.00027632 | 6.40E−06 | 1.18E−05 |
| 5 | −99 | 0.0043482 | −0.000943303 | 8.80E−05 | 4.02E−05 |
| 6 | 5.63E−10 | −0.008290517 | −0.002589257 | 0.002459063 | −0.001193136 |
| 7 | −0.138416859 | −0.014289361 | −0.00123491 | 0.002229056 | −0.001204289 |
| 9 | 0.036727938 | −0.000940377 | 0.000515862 | −0.00114877 | 1.29E−05 |
| 10 | 4.953627573 | −0.01109523 | 0.015494601 | −0.009030839 | 0.003045986 |
| 11 | −2.55E−09 | −0.02331988 | 0.03181512 | −0.021042469 | 0.007958392 |
| 12 | 0.302751929 | −0.035869088 | 0.04902351 | −0.035411008 | 0.015025024 |
| 13 | 0.205848959 | −0.023277792 | 0.032942505 | −0.023246791 | 0.010233776 |
| 14 | −1.31E−09 | 0.003266059 | 0.002438829 | −0.001619752 | 0.001163309 |
| 15 | −6.702870962 | −1.22E−05 | 0.000528481 | −2.94E−05 | −4.04E−05 |
| 16 | 1.50733602 | −0.009150045 | 0.004350287 | −0.000988326 | 0.000200062 |
| 17 | 6.91E−09 | −0.035818955 | 0.013625031 | −0.003817073 | 0.001024193 |
| 18 | 2.175309277 | −0.024406914 | 0.009582871 | −0.003483849 | 0.001040749 |

| Surface No. | E | F | G | H | I |
|---|---|---|---|---|---|
| 4 | −4.12E−06 | 7.45E−07 | −7.97E−08 | 4.74E−09 | −1.19E−10 |
| 5 | −2.25E−05 | 5.36E−06 | −7.10E−07 | 5.06E−08 | −1.51E−09 |
| 6 | 0.000387597 | −8.42E−05 | 1.16E−05 | −9.10E−07 | 3.08E−08 |
| 7 | 4.11E−04 | −9.22E−05 | 1.31E−05 | −1.06E−06 | 3.69E−08 |
| 9 | −3.74E−07 | −1.16E−07 | 3.73E−08 | −4.67E−09 | 1.92E−10 |
| 10 | −6.53E−04 | 9.18E−05 | −8.29E−06 | 4.36E−07 | −1.01E−08 |
| 11 | −0.001879845 | 0.000287419 | −2.81E−05 | 1.61E−06 | −4.12E−08 |
| 12 | −0.003947345 | 0.000655409 | −6.71E−05 | 3.84E−06 | −9.26E−08 |
| 13 | −0.002842888 | 0.000500359 | −5.40E−05 | 3.24E−06 | −8.24E−08 |
| 14 | −0.00048121 | 0.000112805 | −1.44E−05 | 8.65E−07 | −1.67E−08 |
| 15 | 1.23E−05 | −1.82E−06 | 1.60E−07 | −8.24E−09 | 1.94E−10 |
| 16 | −4.77E−05 | 8.02E−06 | −7.05E−07 | 2.67E−08 | −2.41E−10 |
| 17 | −0.000265625 | 4.83E−05 | −5.12E−06 | 2.82E−07 | −6.22E−09 |
| 18 | −0.000232601 | 3.53E−05 | −3.34E−06 | 1.77E−07 | −4.02E−09 |

TABLE 9

| Note | First Position | Second Position |
|---|---|---|
| D1 | 4.47370 | 1.09560 |
| D2 | 3.82730 | 4.27924 |
| D3 | 2.73900 | 5.66060 |

Figure 10:
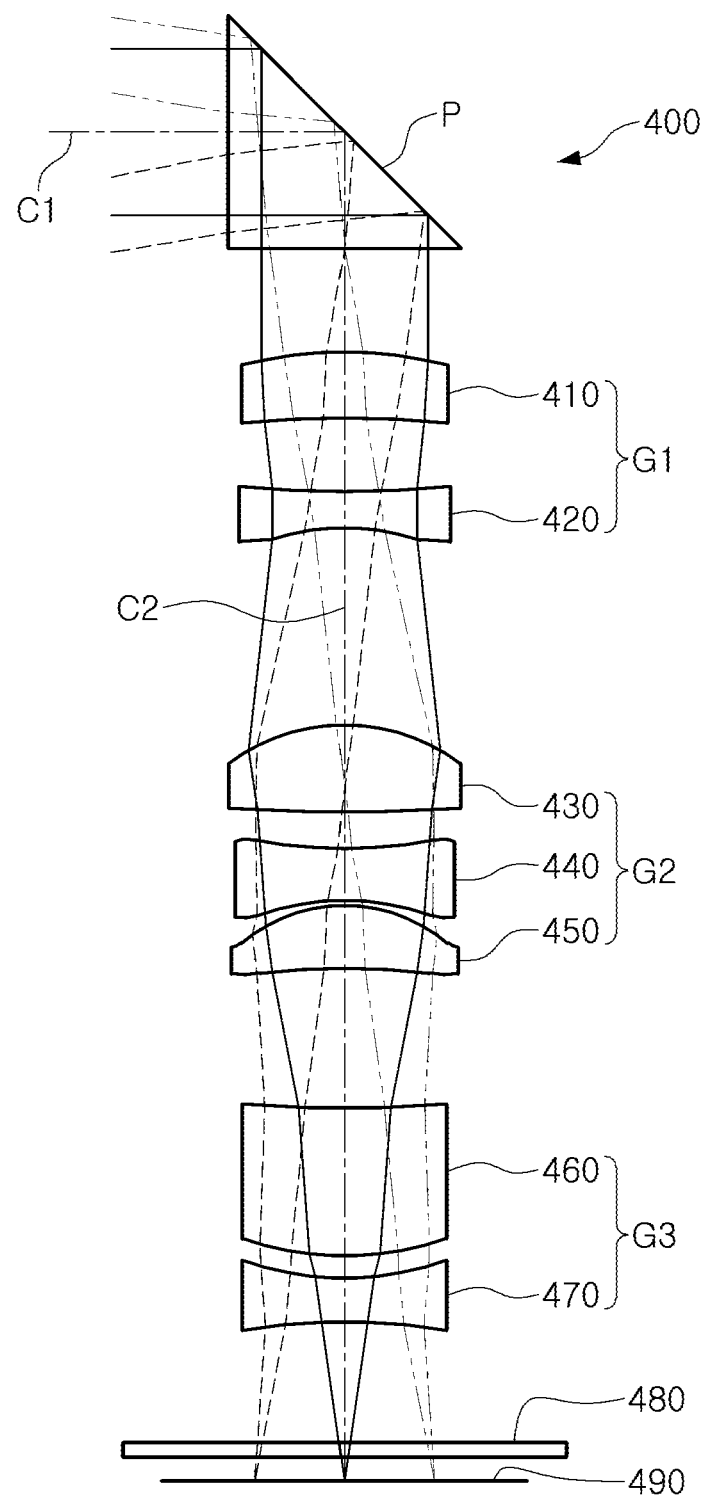
FIG. 10 illustrates a configuration of an optical imaging system according to a fourth example.

An optical imaging system according to a fourth example will be described with reference to FIG. 10.

An optical imaging system 400 includes a prism P, a first lens 410, a second lens 420, a third lens 430, a fourth lens 440, a fifth lens 450, a six-lens 460, and a seventh lens 470 and may be divided into a plurality of lens groups. For example, the optical imaging system 400 may be divided into a first lens group G1, a second lens group G2, and a third lens group G3. The first lens group G1 includes two lenses. For example, the first lens group G1 includes a first lens 410 and a second lens 420. The first lens 410 has positive refractive power and has a shape in which an object-side surface is convex and an image-side surface is concave. The second lens 420 has negative refractive power and has a shape in which an object-side surface is convex and an image-side surface is concave. The second lens group G2 includes three lenses. For example, the second lens group G2 includes a third lens 430, a fourth lens 440, and a fifth lens 450. The third lens 430 has positive refractive power and has a shape in which an object-side surface is convex and an image-side surface is convex. The fourth lens 440 has negative refractive power and has a shape in which an object-side surface is concave and an image-side surface is concave. The fifth lens 450 has positive refractive power and has a shape in which an object-side surface is convex and an image-side surface is convex. The third lens group G3 includes two lenses. For example, the third lens group G3 includes a sixth lens 460 and a seventh lens 470. The sixth lens 460 has positive refractive power and has a shape in which an object-side surface is concave and an image-side surface is convex. The seventh lens 470 has negative refractive power and has a shape in which an object-side surface is concave and an image-side surface is concave.

The lens groups G1, G2, and G3 are moved in an optical axis direction to change a focal length of the optical imaging system. For example, a distance D1 between the first lens group G1 and the second lens group G2 and a distance D2 between the second lens group G2 and the third lens group G3 may be decreased as a focal length of the optical imaging system is increased. Meanwhile, a distance D3 between the third lens group G3 and an imaging plane may be increased as the focal length of the optical imaging system is increased.

Figure 11:
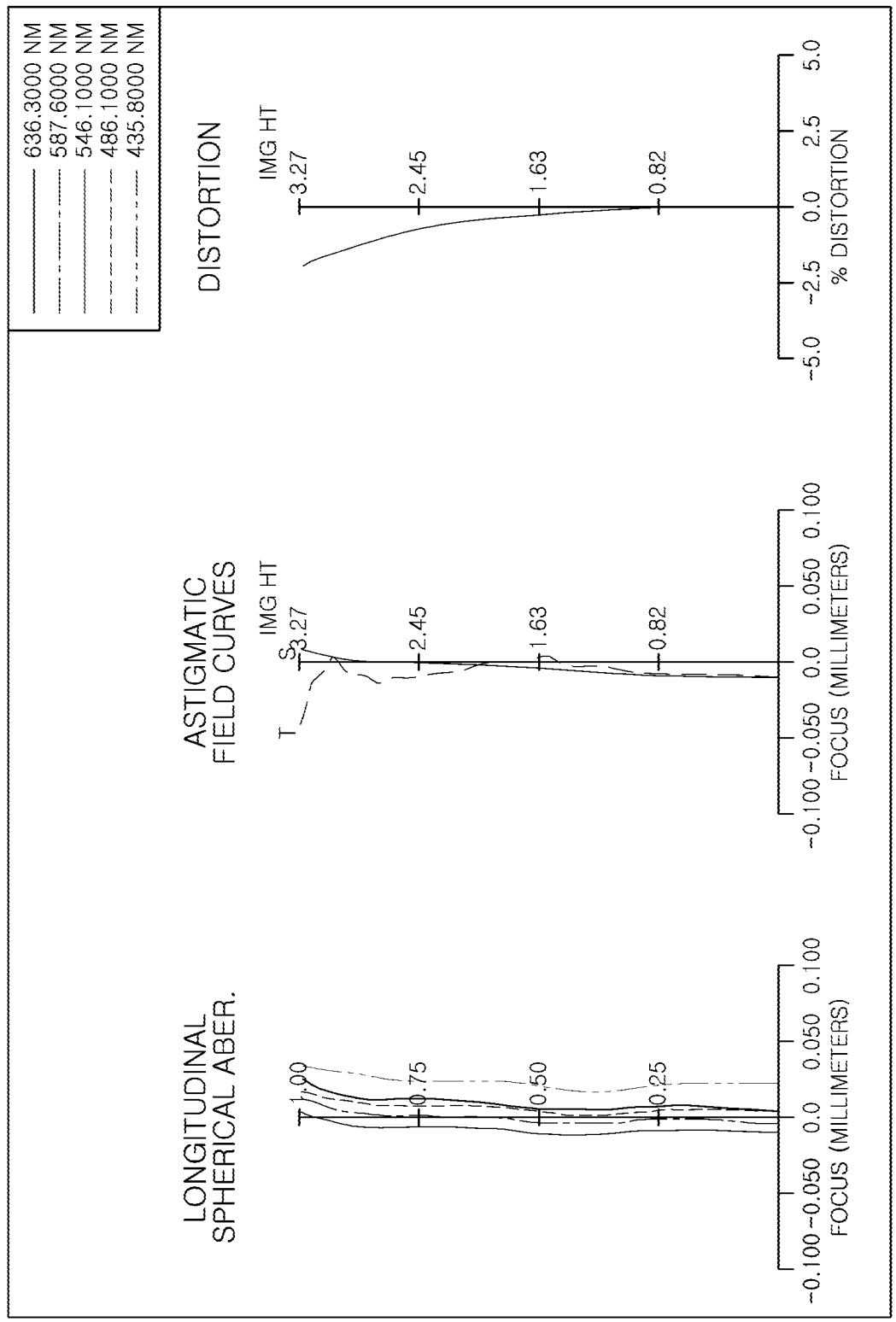
FIG. 11 shows aberration curves in a first zoom position of the optical imaging system illustrated in FIG. 10.
Figure 12:
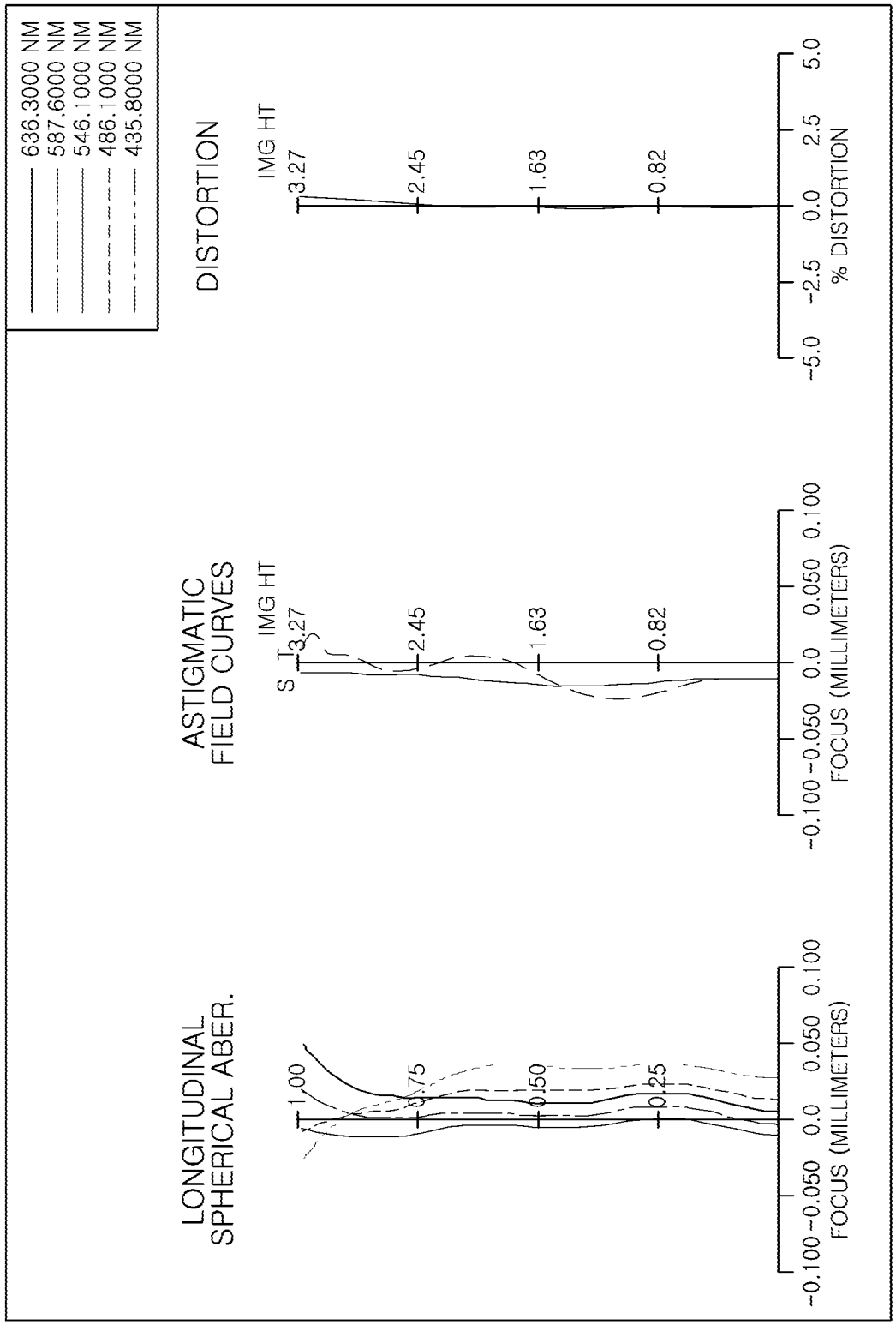
FIG. 12 shows aberration curves in a second zoom position of the optical imaging system illustrated in FIG. 10.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 11 and 12.

The optical imaging system 400 includes a prism P, a stop ST, a filter 480, and an image sensor 490.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 410. The prism P disposed as described above refracts light, reflected from an object (a subject), to the image sensor 490.

The filter 480 is disposed in front of the image sensor 490 to cut off infrared rays, or the like, included in the incident light. The image sensor 490 includes a plurality of optical sensors. The above-configured image sensor 490 is configured to convert an optical signal into an electrical signal.

Table 10 shows lens characteristics of the optical imaging system according to this example, Table 11 shows aspherical values of the optical imaging system according to this example, and Table 12 shows distance values between lens groups depending on a first position and a second position of the optical imaging system.

TABLE 10

| Surface No. | Remark | Radius of Curvature | Thickness/Gap | Focal Length | Refractive Index | Abbe Number |
|---|---|---|---|---|---|---|
| 0 | Object | infinity | infinity | | | |
| 1 | Prism | infinity | 2.6000 | | 1.6349 | 23.900 |
| 2 | | infinity | 2.6000 | | 1.6349 | 23.900 |
| 3 | | infinity | 2.2825 | | | |
| 4* | First Lens | 10.56728 | 1.5000 | 23.4390 | 1.6600 | 20.400 |
| 5* | | 30.59094 | 1.6000 | | | |
| 6* | Second Lens | 20.71156 | 0.8000 | −7.9890 | 1.5676 | 37.300 |
| 7* | | 3.68714 | 0.0000 | | | |
| 8 | Stop | infinity | D1 | | | |
| 9* | Third Lens | 4.65460 | 1.9500 | 6.8200 | 1.5441 | 56.000 |
| 10* | | −15.94063 | 0.7587 | | | |
| 11* | Fourth Lens | −23.32517 | 1.2000 | −6.8410 | 1.6150 | 25.900 |
| 12* | | 5.29307 | 0.1200 | | | |
| 13* | Fifth Lens | 4.53396 | 1.4500 | 7.4830 | 1.5441 | 56.000 |
| 14* | | −37.03922 | D2 | | | |
| 15* | Sixth Lens | −20.49173 | 3.3800 | 12.6780 | 1.6714 | 19.200 |
| 16* | | −6.46999 | 0.4262 | | | |
| 17* | Seventh Lens | −9.63313 | 1.0098 | −7.5580 | 1.5441 | 56.000 |
| 18* | | 7.5 | D3 | | | |
| 19 | Filter | infinity | 0.3000 | | 1.5167 | 64.100 |
| 20 | | infinity | 0.3880 | | | |
| 21 | Imaging plane | infinity | 0.1519 | | | |

(In Table 10, *marked surfaces are aspherical surfaces)

TABLE 11

| Surface No. | K | A | B | C | D |
|---|---|---|---|---|---|
| 4 | −11.1709626 | 0.003329028 | −0.000472689 | 0.000147904 | −4.40E−05 |
| 5 | −99 | 0.004105607 | −0.001316934 | 0.000532089 | −0.000180262 |
| 6 | 0 | −0.012465822 | −0.001290175 | 0.001808047 | −0.000813822 |
| 7 | −0.381533001 | −0.018081983 | 0.00012009 | 0.001738762 | −0.001083095 |
| 9 | 0.176027917 | −3.90E−05 | −5.75E−05 | 0.000145668 | −5.58E−05 |
| 10 | −4.380728333 | −0.000917586 | 0.000841937 | 0.000517801 | −0.000431423 |
| 11 | −2.65E−09 | −0.010734809 | 0.003777219 | 0.001073792 | −0.00163704 |
| 12 | 0.135825238 | −0.020815713 | 0.01679692 | −0.007995234 | 0.001905339 |
| 13 | 0.48452235 | −0.007922029 | 0.015233134 | −0.010359651 | 0.004062044 |
| 14 | −1.14E−09 | 0.009762195 | −1.28E−05 | 0.000661654 | −0.001667334 |
| 15 | −6.702870961 | 0.00458486 | −0.002471294 | 0.002046521 | −0.001405064 |
| 16 | −4.398560658 | −0.001830474 | 0.000166915 | 0.000856762 | −0.000683273 |
| 17 | 3.150690706 | −0.02499084 | 0.010781553 | −0.0034022 | 0.000751858 |
| 18 | 1.77002095 | −0.024376318 | 0.010434738 | −0.00428913 | 0.001385089 |

| Surface No. | E | F | G | H | I |
|---|---|---|---|---|---|
| 4 | 1.10E−05 | −2.04E−06 | 2.43E−07 | −1.63E−08 | 4.69E−10 |
| 5 | 4.97E−05 | −1.05E−05 | 1.49E−06 | −1.23E−07 | 4.43E−09 |
| 6 | 0.000245403 | −5.27E−05 | 7.46E−06 | −5.98E−07 | 1.95E−08 |
| 7 | 4.49E−04 | −0.000134636 | 2.70E−05 | −3.15E−06 | 1.59E−07 |
| 9 | 9.73E−06 | −6.56E−07 | 2.00E−08 | −4.40E−09 | 3.50E−10 |
| 10 | 1.23E−04 | −1.47E−05 | 3.01E−07 | 7.39E−08 | −4.29E−09 |
| 11 | 0.000688475 | −0.000142545 | 1.47E−05 | −6.18E−07 | 1.21E−09 |
| 12 | −5.74E−06 | −8.78E−05 | 1.51E−05 | −7.72E−07 | −2.98E−09 |
| 13 | −0.000846346 | 7.77E−05 | 1.08E−06 | −7.37E−07 | 3.90E−08 |
| 14 | 0.001440604 | −0.000635954 | 0.00015732 | −2.08E−05 | 1.13E−06 |
| 15 | 0.000580435 | −0.000144539 | 2.10E−05 | −1.63E−06 | 5.21E−08 |
| 16 | 0.000236929 | −4.42E−05 | 4.52E−06 | −2.37E−07 | 4.98E−09 |
| 17 | −9.37E−05 | 5.39E−06 | −5.03E−08 | −7.24E−09 | 2.13E−10 |
| 18 | −0.000303682 | 4.27E−05 | −3.63E−06 | 1.65E−07 | −3.06E−09 |

TABLE 12

| Note | First Position | Second Position |
| --- | --- | --- |
| D1 | 4.48000 | 1.09500 |
| D2 | 3.07531 | 3.50723 |
| D3 | 2.72000 | 5.67000 |

Figure 13:
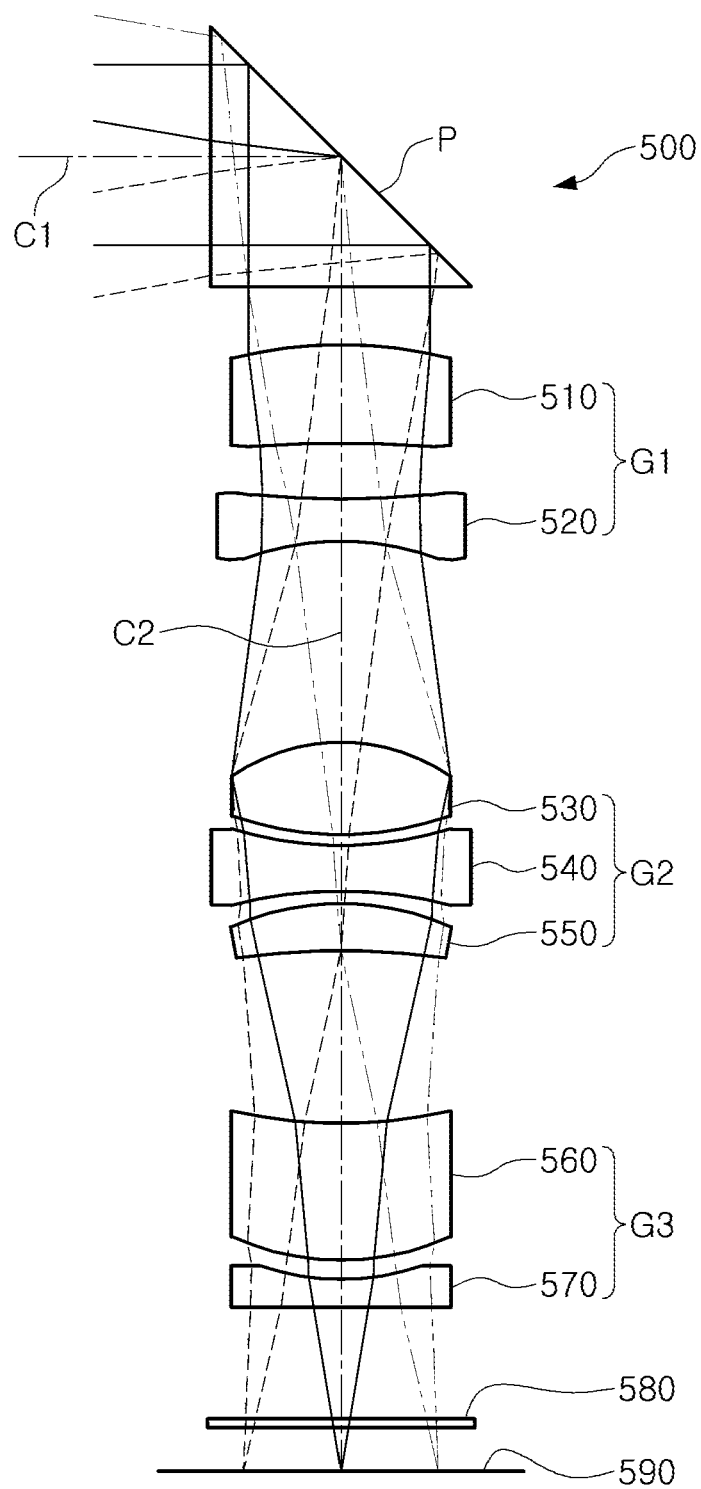
FIG. 13 illustrates a configuration of an optical imaging system according to a fifth example.

An optical imaging system according to a fifth example will be described with reference to FIG. 13.

The optical imaging system 500 includes a prism P, a first lens 510, a second lens 520, a third lens 530, a fourth lens 540, a fifth lens 550, a sixth lens 560, and a seventh lens 570 and may be divided into a plurality of lens groups. For example, the optical imaging system 500 may be divided into a first lens group G1, a second lens group G2, and a third lens group G3. The first lens group G1 includes two lenses. For example, the first lens group G1 includes a first lens 510 and a second lens 520. The first lens 510 has positive refractive power and has a shape in which an object-side surface is convex and an image-side surface is concave. The second lens 520 has negative refractive power and has a shape in which an object-side surface is convex and an image-side surface is concave. The second lens group G2 includes three lenses. For example, the second lens group G2 includes a third lens 530, a fourth lens 540, and a fifth lens 550. The third lens 530 has positive refractive power and has a shape in which an object-side surface is convex and an image-side surface is convex. The fourth lens 540 has a negative refractive power and has a shape in which an object-side surface is concave and an image-side surface is concave. The fifth lens 550 has positive refractive power and has a shape in which an object-side surface is convex and an image-side surface is convex. The third lens group G3 includes two lenses. For example, the third lens group G3 includes a sixth lens 560 and a seventh lens 570. The sixth lens 560 has positive refractive power and has a shape in which an object-side surface is concave and an image-side surface is convex. The seventh lens 570 has negative refractive power and has a shape in which an object-side surface is concave and an image-side surface is concave.

The lens groups G1, G2, and G3 are moved in an optical axis direction to change a focal length of the optical imaging system. For example, a distance D1 between the first lens group G1 and the second lens group G2 and a distance D2 between the second lens group G2 and the third lens group G3 may be decreased as a focal length of the optical imaging system is increased. Meanwhile, a distance D3 between the third lens group G3 and an imaging plane may be increased as the focal length of the optical imaging system is increased.

Figure 14:
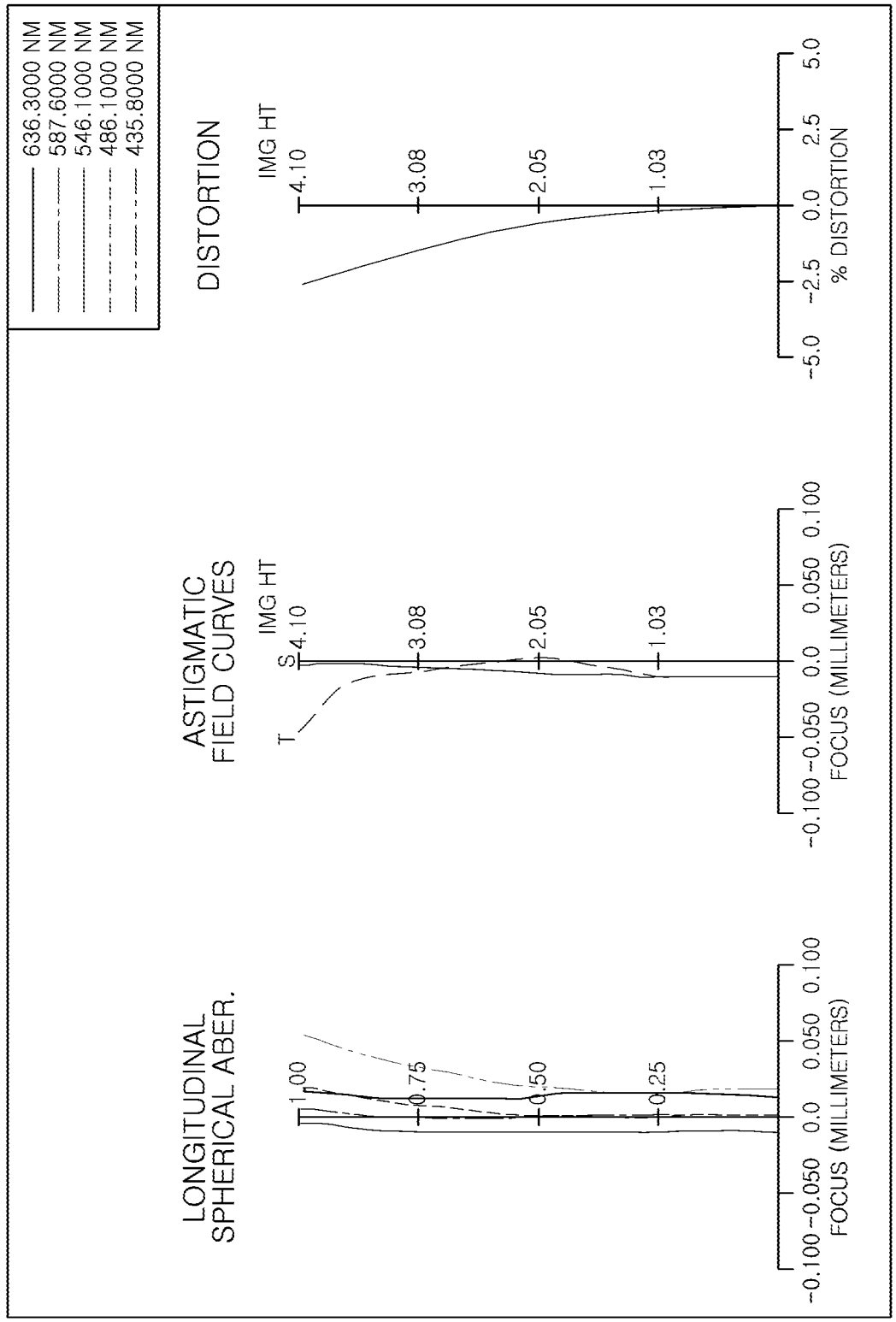
FIG. 14 shows aberration curves in a first zoom position of the optical imaging system illustrated in FIG. 13.
Figure 15:
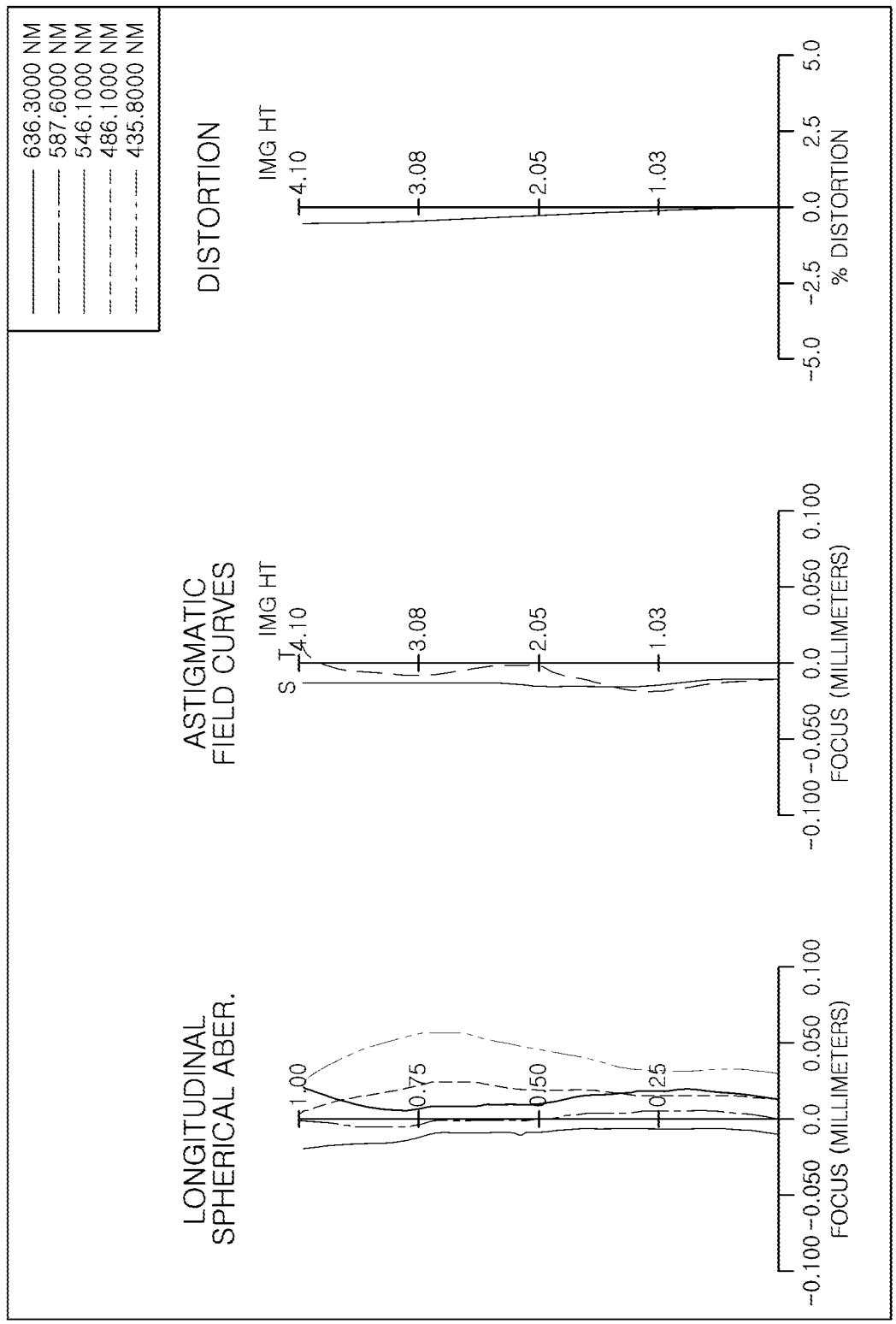
FIG. 15 shows aberration curves in a second zoom position of the optical imaging system illustrated in FIG. 13.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 14 and 15.

The optical imaging system 500 includes a prism P, a stop ST, a filter 580, and an image sensor 590.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 510. The prism P disposed as described above refracts light, reflected from an object (a subject), to the image sensor 590.

The filter 580 is disposed in front of the image sensor 590 to cut off infrared rays, or the like, included in the incident light. The image sensor 590 includes a plurality of optical sensors. The above-configured image sensor 590 is configured to convert an optical signal into an electrical signal.

Table 13 shows lens characteristics of the optical imaging system according to this example, Table 14 shows aspherical values of the optical imaging system according to this example, and Table 15 shows distance values between lens groups depending on a first position and a second position of the optical imaging system.

TABLE 13

| Surface No. | Remark | Radius of Curvature | Thickness/Gap | Focal Length | Refractive Index | Abbe Number |
| --- | --- | --- | --- | --- | --- | --- |
| 0 | Object | infinity | infinity | | | |
| 1 | Prism | infinity | 3.2000 | | 1.6349 | 23.900 |
| 2 | | infinity | 3.2000 | | 1.6349 | 23.900 |
| 3 | | infinity | 1.4598 | | | |
| 4* | First Lens | 13.29356 | 2.4000 | 25.5780 | 1.6600 | 20.400 |
| 5* | | 55.35429 | 1.4000 | | | |
| 6* | Second | 86.54097 | 1.0000 | −8.6000 | 1.5676 | 37.300 |
| 7* | Lens | 4.62921 | 0.0000 | | | |
| 8 | Stop | infinity | D1 | | | |
| 9* | Third Lens | 5.09364 | 2.2283 | 6.4300 | 1.5441 | 56.000 |
| 10* | | −9.58100 | 0.2500 | | | |
| 11* | Fourth | −14.16950 | 1.2000 | −9.3670 | 1.6150 | 25.900 |
| 12* | Lens | 10.17742 | 0.2726 | | | |
| 13* | Fifth Lens | 8.01012 | 1.2000 | 13.1880 | 1.5441 | 56.000 |
| 14* | | −68.14193 | D2 | | | |
| 15* | Sixth Lens | −11.48048 | 3.3800 | 18.8040 | 1.6714 | 19.200 |
| 16* | | −6.76743 | 0.4200 | | | |
| 17* | Seventh | −25.92795 | 0.6730 | −10.4560 | 1.5441 | 56.000 |
| 18* | Lens | 7.39724 | D3 | | | |

TABLE 13-continued

| Surface No. | Remark | Radius of Curvature | Thickness/Gap | Focal Length | Refractive Index | Abbe Number |
|---|---|---|---|---|---|---|
| 19 | Filter | infinity | 0.1100 | | 1.5167 | 64.100 |
| 20 | | infinity | 0.8062 | | | |
| 21 | Imaging Plane | infinity | 0.2398 | | | |

(In Table 13, *marked surfaces are aspherical surfaces)

TABLE 14

| Surface No. | K | A | B | C | D |
|---|---|---|---|---|---|
| 4 | −17.57401954 | 0.001664826 | −5.81E−05 | 3.04E−07 | 1.96E−06 |
| 5 | −99 | 0.001577863 | −0.000208991 | 5.64E−05 | −9.60E−06 |
| 6 | 0 | −0.006970916 | −1.20E−06 | 0.00037904 | −1.72E−04 |
| 7 | 0 | −0.010342467 | 0.000463001 | 3.02E−04 | −0.000173627 |
| 9 | 0 | −0.000233794 | −3.36E−05 | 5.82E−05 | −3.45E−05 |
| 10 | 0 | −0.005979013 | 0.007667736 | −4.33E−03 | 0.001473972 |
| 11 | 0 | −0.012750259 | 0.013729473 | −0.008188159 | 0.00301475 |
| 12 | 0 | −0.018939665 | 0.022025044 | −0.014370142 | 0.005858933 |
| 13 | 0 | −0.013292598 | 0.018002103 | −0.011696733 | 0.004701092 |
| 14 | 0 | 0.001349832 | 0.001910194 | −0.001123441 | 0.000355935 |
| 15 | 0 | 0.00092278 | −0.000486473 | 0.000235583 | −0.000107237 |
| 16 | 0 | −0.002369001 | 0.000645723 | 6.01E−05 | −7.27E−05 |
| 17 | 0 | −0.029414593 | 0.006666487 | −0.000799631 | −3.15E−05 |
| 18 | 0 | −0.027210132 | 0.007181495 | −0.001617686 | 0.000297276 |

| Surface No. | E | F | G | H | I |
|---|---|---|---|---|---|
| 4 | −5.66E−07 | 8.14E−08 | −6.60E−09 | 2.87E−10 | −5.24E−12 |
| 5 | 9.72E−10 | 2.91E−07 | −5.19E−08 | 3.98E−09 | −1.18E−10 |
| 6 | 4.49E−05 | −7.55E−06 | 8.00E−07 | −4.81E−08 | 1.25E−09 |
| 7 | 5.11E−05 | −9.40E−06 | 1.07E−06 | −6.94E−08 | 1.94E−09 |
| 9 | 1.06E−05 | −1.82E−06 | 1.80E−07 | −9.49E−09 | 2.06E−10 |
| 10 | −3.20E−04 | 4.48E−05 | −3.88E−06 | 1.88E−07 | −3.89E−09 |
| 11 | −0.000715998 | 1.10E−04 | −1.04E−05 | 5.54E−07 | −1.26E−08 |
| 12 | −0.001541652 | 0.000260413 | −2.71E−05 | 1.57E−06 | −3.87E−08 |
| 13 | −0.001208219 | 0.000198292 | −2.00E−05 | 1.11E−06 | −2.64E−08 |
| 14 | −4.21E−05 | −6.06E−06 | 2.62E−06 | −3.14E−07 | 1.32E−08 |
| 15 | 3.09E−05 | −5.57E−06 | 6.05E−07 | −3.65E−08 | 9.34E−10 |
| 16 | 1.91E−05 | −2.64E−06 | 2.09E−07 | −8.84E−09 | 1.54E−10 |
| 17 | 3.11E−05 | −5.58E−06 | 5.11E−07 | −2.44E−08 | 4.80E−10 |
| 18 | −4.21E−05 | 4.35E−06 | −3.04E−07 | 1.27E−08 | −2.39E−10 |

TABLE 15

| Note | First Position | Second Position |
|---|---|---|
| D1 | 4.99573 | 1.20000 |
| D2 | 4.21427 | 4.80000 |
| D3 | 3.00000 | 6.20000 |

Figure 16:
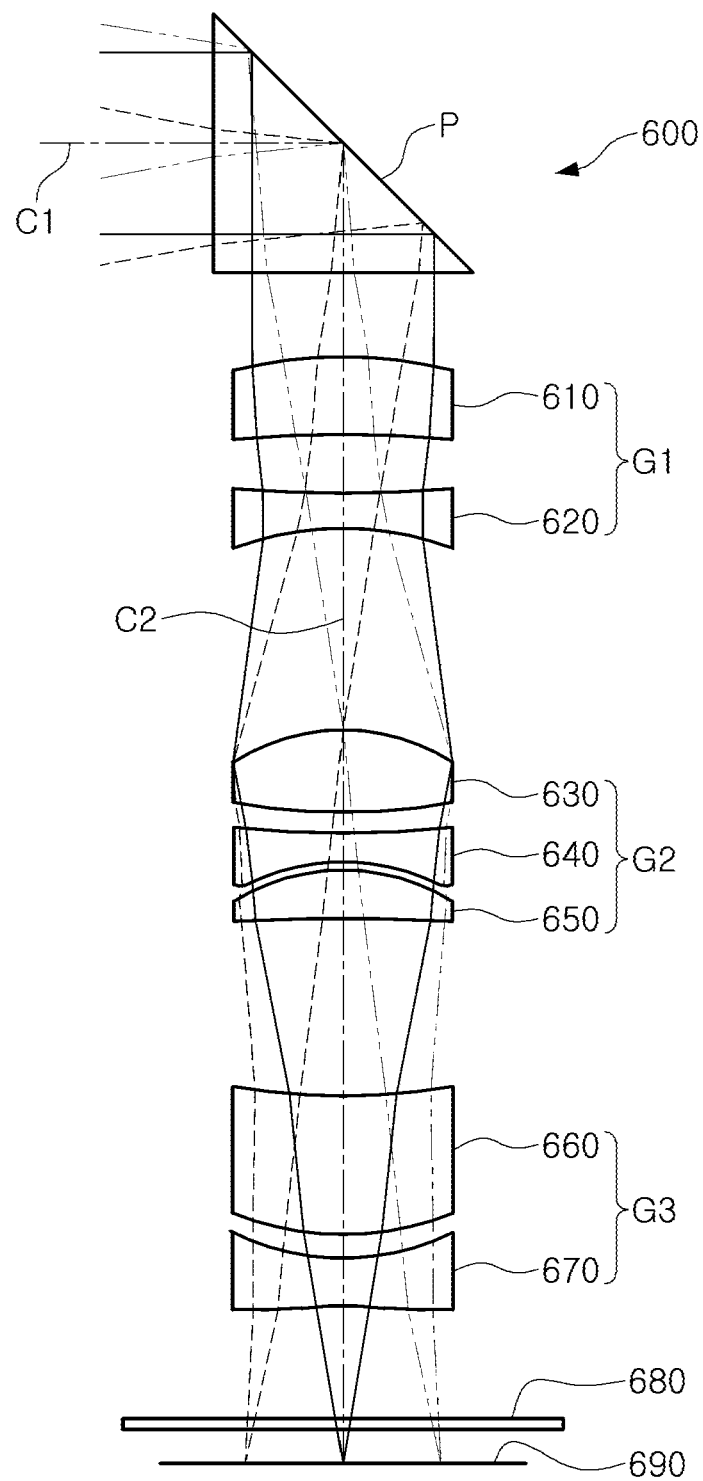
FIG. 16 illustrates a configuration of an optical imaging system according to a sixth example.

An optical imaging system according to a sixth embodiment will be described with reference to FIG. 16.

The optical imaging system 600 includes a prism P, a first lens 610, a second lens 620, a third lens 630, a fourth lens 640, a fifth lens 650, a sixth lens 660, and a seventh lens 660 and may be divided into a plurality of lens groups. For example, the optical imaging system 600 may be divided into a first lens group G1, a second lens group G2, and a third lens group G3. The first lens group G1 includes two lenses. For example, the first lens group G1 includes a first lens 610 and a second lens 620. The first lens 610 has positive refractive power and has a shape in which an object-side surface is convex and an image-side surface is concave. The second lens 620 has negative refractive power and has a shape in which an object-side surface is convex and an image-side surface is concave. The second lens group G2 includes three lenses. For example, the second lens group G2 includes a third lens 630, a fourth lens 640, and a fifth lens 650. The third lens 630 has positive refractive power and has a shape in which an object-side surface is convex and an image-side surface is convex. The fourth lens 640 has negative refractive power and has a shape in which an object-side surface is concave and an image-side surface is concave. The fifth lens 650 has a positive refractive power and has a shape in which an object-side surface is convex and an image-side surface is convex. The third lens group G3 includes two lenses. For example, the third lens group G3 includes a sixth lens 660 and a seventh lens 670. The sixth lens 660 has positive refractive power and has a shape in which an object-side surface is concave and an image-side surface is convex. The seventh lens 670 has negative refractive power and has a shape in which an object-side surface is concave and an image-side surface is concave.

The lens groups G1, G2, and G3 are moved in an optical axis direction to change a focal length of the optical imaging system. For example, a distance D1 between the first lens group G1 and the second lens group G2 and a distance D2 between the second lens group G2 and the third lens group G3 may be decreased as a focal length of the optical imaging system is increased. Meanwhile, a distance D3 between the third lens group G3 and an imaging plane may be increased as the focal length of the optical imaging system is increased.

Figure 17:
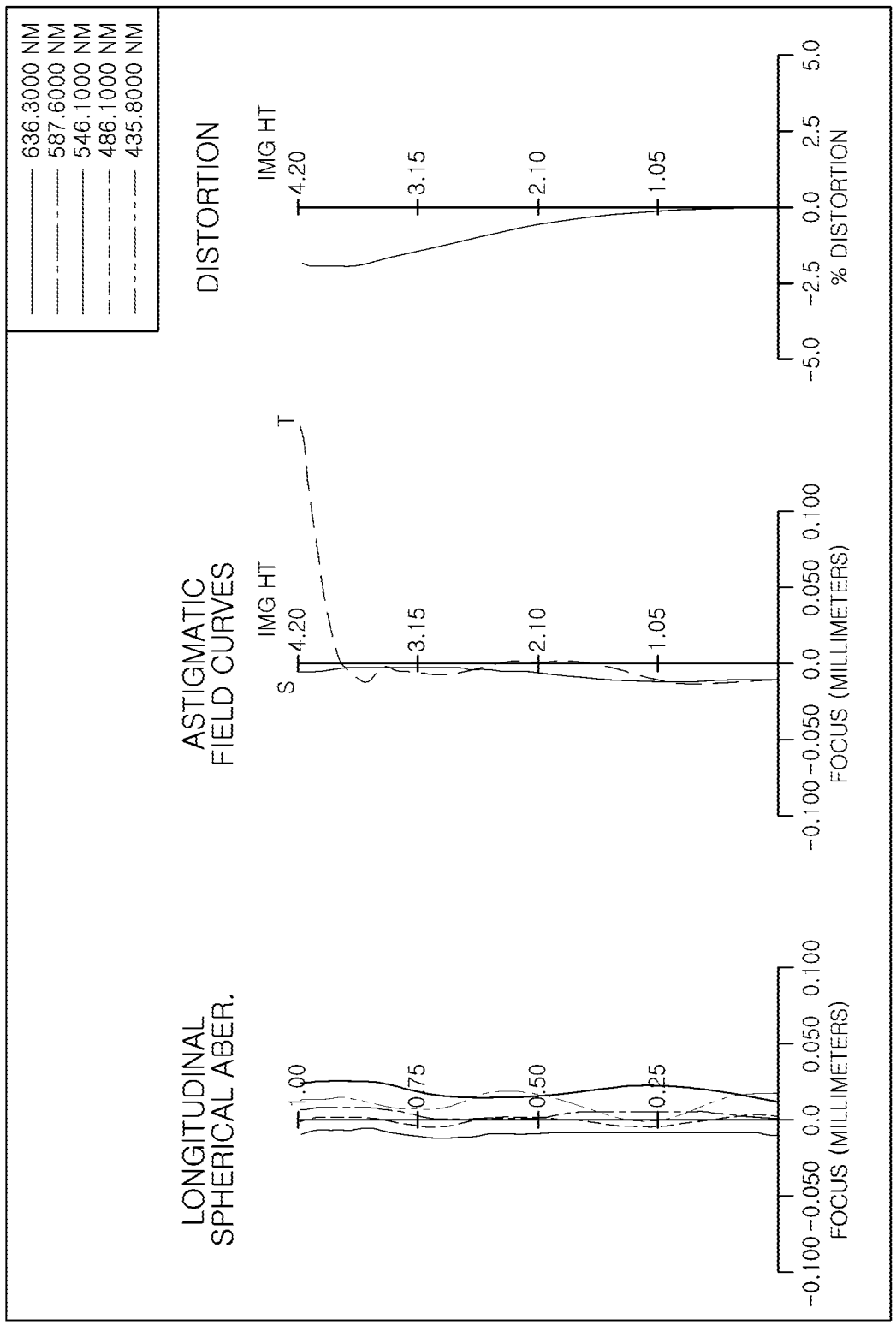
FIG. 17 shows aberration curves in a first zoom position of the optical imaging system illustrated in FIG. 16.
Figure 18:
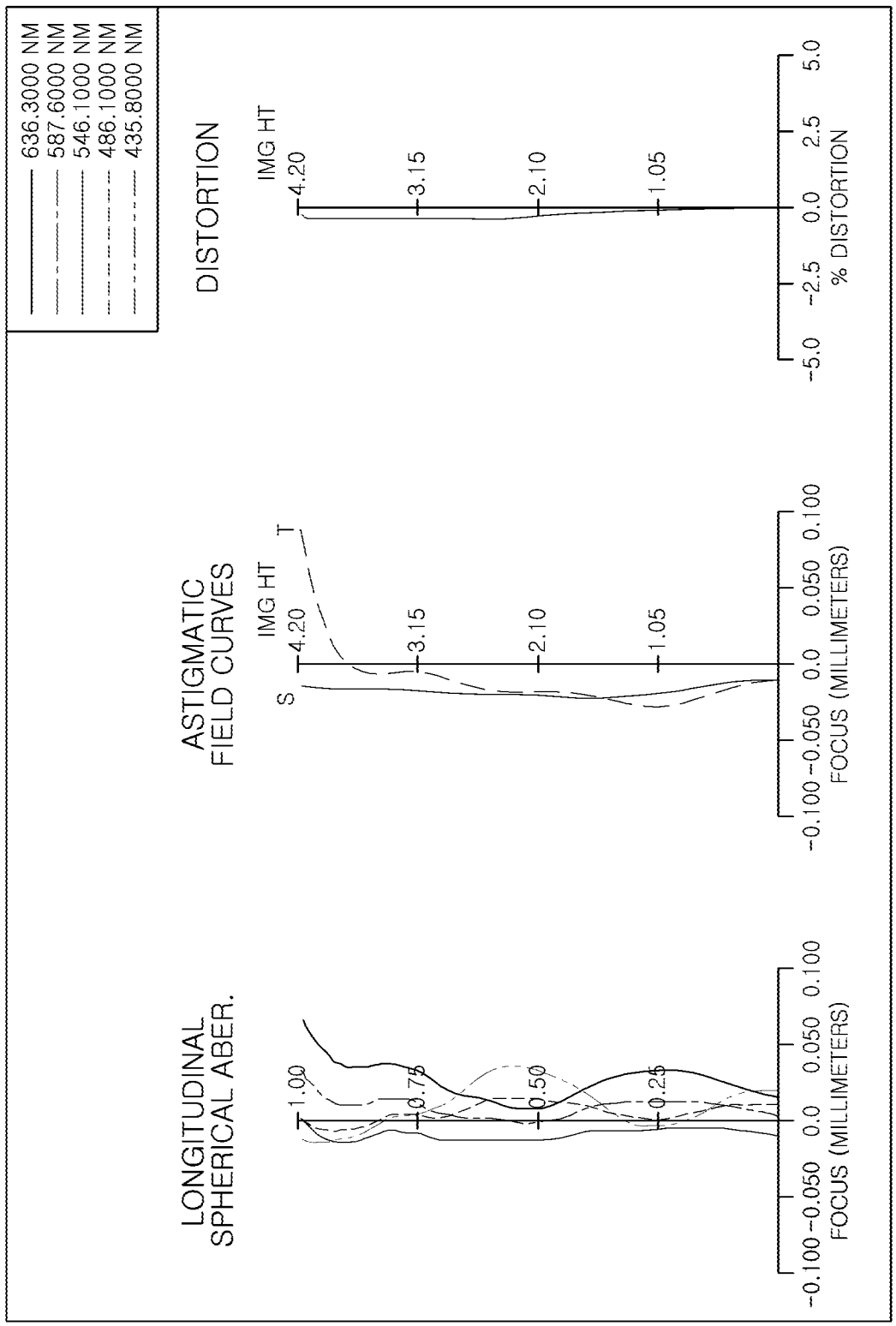
FIG. 18 shows aberration curves in a second zoom position of the optical imaging system illustrated in FIG. 16.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 17 and 18.

The optical imaging system 600 includes a prism P, a stop ST, a filter 680, and an image sensor 690.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 610. The prism P disposed as described above refracts light, reflected from an object (a subject), to the image sensor 690.

The filter 680 is disposed in front of the image sensor 690 to cut off infrared rays, or the like, included in the incident light. The image sensor 690 includes a plurality of optical sensors. The above-configured image sensor 690 is configured to convert an optical signal into an electrical signal.

Table 16 shows lens characteristics of the optical imaging system according to this example, Table 17 shows aspherical values of the optical imaging system according to this example, and Table 18 shows distance values between lens groups depending on a first position and a second position of the optical imaging system.

TABLE 16

| Surface No. | Remark | Radius of Curvature | Thickness/Gap | Focal Length | Refractive Index | Abbe Number |
|---|---|---|---|---|---|---|
| 0 | Object | infinity | infinity | | | |
| 1 | Prism | infinity | 3.2000 | | 1.6349 | 23.900 |
| 2 | | infinity | 3.2000 | | 1.6349 | 23.900 |
| 3 | | infinity | 2.0000 | | | |
| 4* | First Lens | 13.71404 | 2.0018 | 26.3220 | 1.6714 | 19.200 |
| 5* | | 55.32403 | 1.4000 | | | |
| 6* | Second Lens | 35.29727 | 0.8482 | −9.0320 | 1.5676 | 37.300 |
| 7* | | 4.46211 | 0.0000 | | | |
| 8 | Stop | infinity | D1 | | | |
| 9* | Third Lens | 5.18735 | 2.0000 | 7.4800 | 1.5441 | 56.000 |
| 10* | | −16.66537 | 0.5400 | | | |
| 11* | Fourth Lens | −78.38531 | 0.7534 | −8.7040 | 1.6150 | 25.900 |
| 12* | | 5.82323 | 0.1500 | | | |
| 13* | Fifth Lens | 6.03058 | 1.2000 | 9.5840 | 1.5441 | 56.000 |
| 14* | | −37.05267 | D2 | | | |
| 15* | Sixth Lens | −16.98455 | 3.3800 | 19.9800 | 1.6714 | 19.200 |
| 16* | | −8.15277 | 0.6000 | | | |
| 17* | Seventh Lens | −12.93065 | 1.2000 | −10.2870 | 1.5441 | 56.000 |
| 18* | | 10.27270 | D3 | | | |
| 19 | Filter | infinity | 0.2100 | | 1.5167 | 64.100 |
| 20 | | infinity | 0.6673 | | | |
| 21 | Imaging plane | infinity | 0.1800 | | | |

(In Table 16, *marked surfaces are aspherical surfaces)

TABLE 17

| Surface No. | K | A | B | C | D |
|---|---|---|---|---|---|
| 4 | −17.06759429 | 0.001749133 | −4.16E−05 | −1.88E−05 | 7.64E−06 |
| 5 | −99 | 0.002102427 | −0.00013639 | −6.20E−05 | 3.86E−05 |
| 6 | 0 | −0.007094306 | 0.00020469 | 0.000118376 | −4.09E−05 |
| 7 | 0 | −0.011132577 | 0.000580983 | 0.000176771 | −0.000107038 |
| 9 | 0 | −0.000515609 | 0.000154326 | −4.05E−05 | 9.24E−06 |
| 10 | 0 | −0.002883654 | 0.003538801 | −0.0015407 | 0.000374512 |
| 11 | 0 | −0.014051223 | 0.014146786 | −0.007452772 | 0.002291448 |
| 12 | 0 | −0.030444185 | 0.034796062 | −0.019961358 | 0.006456359 |
| 13 | 0 | −0.018370212 | 0.025606798 | −0.014720613 | 0.004706285 |
| 14 | 0 | 0.003690253 | 0.001061234 | −0.000825921 | 0.000418605 |
| 15 | 0 | 0.001681159 | −0.000214028 | 8.68E−05 | −4.51E−05 |
| 16 | 0 | −0.004431238 | 0.002100181 | −0.000515763 | 0.000129339 |
| 17 | 0 | −0.023148254 | 0.005837524 | −0.000775469 | 5.98E−05 |
| 18 | 0 | −0.016748439 | 0.004220616 | −0.000962916 | 0.000220559 |

| Surface No. | E | F | G | H | I |
|---|---|---|---|---|---|
| 4 | −1.59E−06 | 2.00E−07 | −1.51E−08 | 6.30E−10 | −1.12E−11 |
| 5 | −1.16E−05 | 2.05E−06 | −2.16E−07 | 1.26E−08 | −3.09E−10 |

TABLE 17-continued

| | | | | | |
|---|---|---|---|---|---|
| 6 | 6.77E−06 | −4.99E−07 | −1.19E−08 | 4.60E−09 | −2.20E−10 |
| 7 | 3.17E−05 | −5.90E−06 | 6.87E−07 | −4.52E−08 | 1.29E−09 |
| 9 | −2.14E−06 | 4.18E−07 | −4.71E−08 | 2.63E−09 | −5.76E−11 |
| 10 | −5.61E−05 | 5.63E−06 | −3.96E−07 | 1.80E−08 | −3.80E−10 |
| 11 | −0.000441117 | 5.54E−05 | −4.54E−06 | 2.25E−07 | −5.10E−09 |
| 12 | −0.001255028 | 0.000151868 | −1.15E−05 | 5.11E−07 | −1.05E−08 |
| 13 | −0.000897686 | 0.00010534 | −7.53E−06 | 3.06E−07 | −5.56E−09 |
| 14 | −0.000145434 | 3.31E−05 | −4.61E−06 | 3.53E−07 | −1.14E−08 |
| 15 | 1.10E−05 | −1.82E−06 | 2.12E−07 | −1.61E−08 | 5.51E−10 |
| 16 | −3.15E−05 | 5.01E−06 | −4.54E−07 | 2.14E−08 | −4.11E−10 |
| 17 | −9.72E−06 | 2.16E−06 | −2.27E−07 | 1.04E−08 | −1.66E−10 |
| 18 | −4.54E−05 | 6.87E−06 | −6.62E−07 | 3.59E−08 | −8.35E−10 |

TABLE 18

| Note | First Position | Second Position |
|---|---|---|
| D1 | 4.97162 | 1.20000 |
| D2 | 4.33772 | 4.70434 |
| D3 | 2.80000 | 6.20000 |

Figure 19:
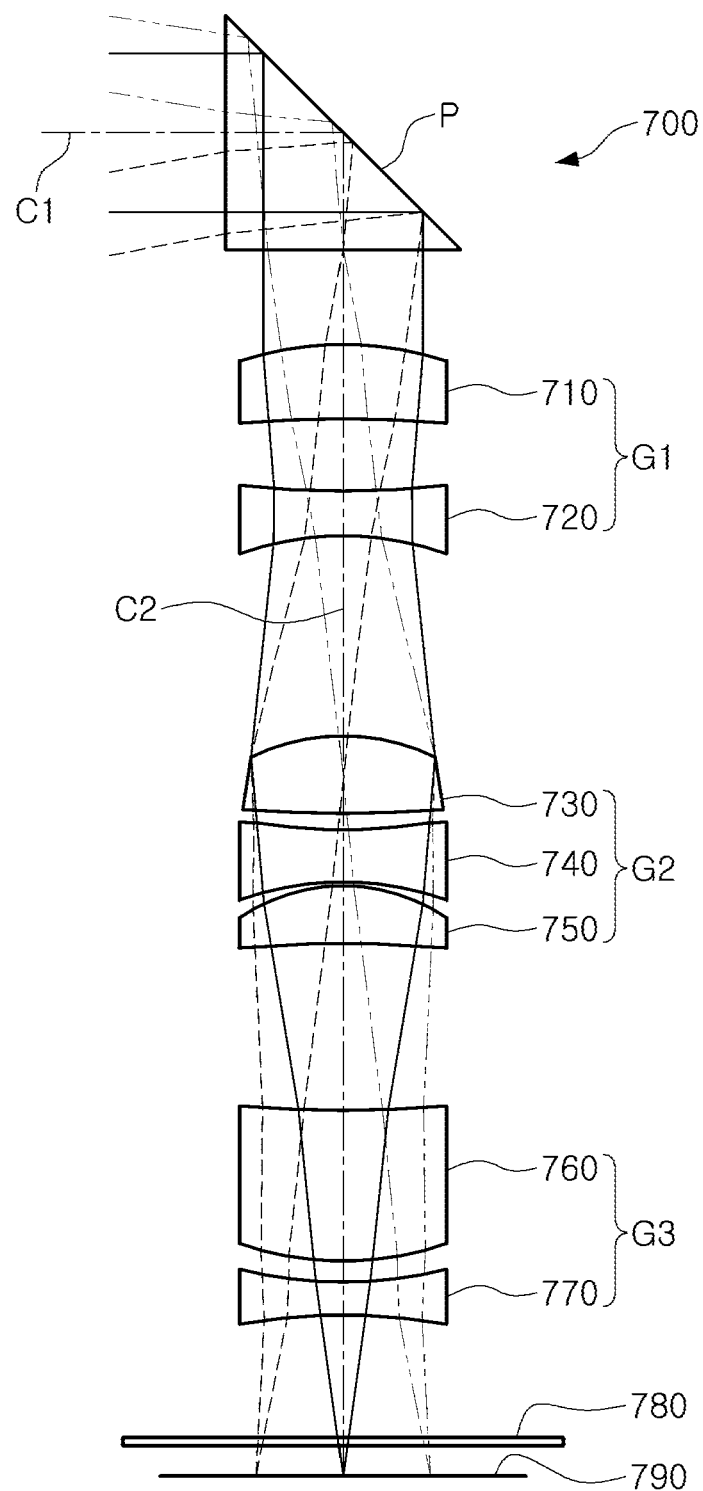
FIG. 19 illustrates a configuration of an optical imaging system according to a seventh example.

An optical imaging system according to a seventh embodiment will be described with reference to FIG. 19.

An optical imaging system 700 includes a prism P, a first lens 710, a second lens 720, a third lens 730, a fourth lens 740, a fifth lens 750, a sixth lens 760, and a seventh lens 770 and may be divided into a plurality of lens groups. For example, the optical imaging system 700 may be divided into a first lens group G1, a second lens group G2, and a third lens group G3. The first lens group G1 includes two lenses. For example, the first lens group G1 includes a first lens 710 and a second lens 720. The first lens 710 has positive refractive power and has a shape in which an object-side surface is convex and an image-side surface is concave. The second lens 720 has negative refractive power and has a shape in which an object-side surface is convex and an image-side surface is concave. The second lens group G2 includes three lenses. For example, the second lens group G2 includes a third lens 730, a fourth lens 740, and a fifth lens 750. The third lens 730 has positive refractive power and has a shape in which an object-side surface is convex and an image-side surface is convex. The fourth lens 740 has negative refractive power and has a shape in which an object-side surface is concave and an image-side surface is concave. The fifth lens 750 has positive refractive power and has a shape in which an object-side surface is convex and an image-side surface is convex. The third lens group G3 includes two lenses. For example, the third lens group G3 includes a sixth lens 760 and a seventh lens 770. The sixth lens 760 has positive refractive power, an object side is concave, and an image side is convex. The seventh lens 770 has negative refractive power and has a shape in which an object-side surface is concave and an image-side surface is concave.

The lens groups G1, G2, and G3 are moved in an optical axis direction to change a focal length of the optical imaging system. For example, a distance D1 between the first lens group G1 and the second lens group G2 and a distance D2 between the second lens group G2 and the third lens group G3 may be decreased as a focal length of the optical imaging system is increased. Meanwhile, a distance D3 between the third lens group G3 and an imaging plane may be increased as the focal length of the optical imaging system is increased.

Figure 20:
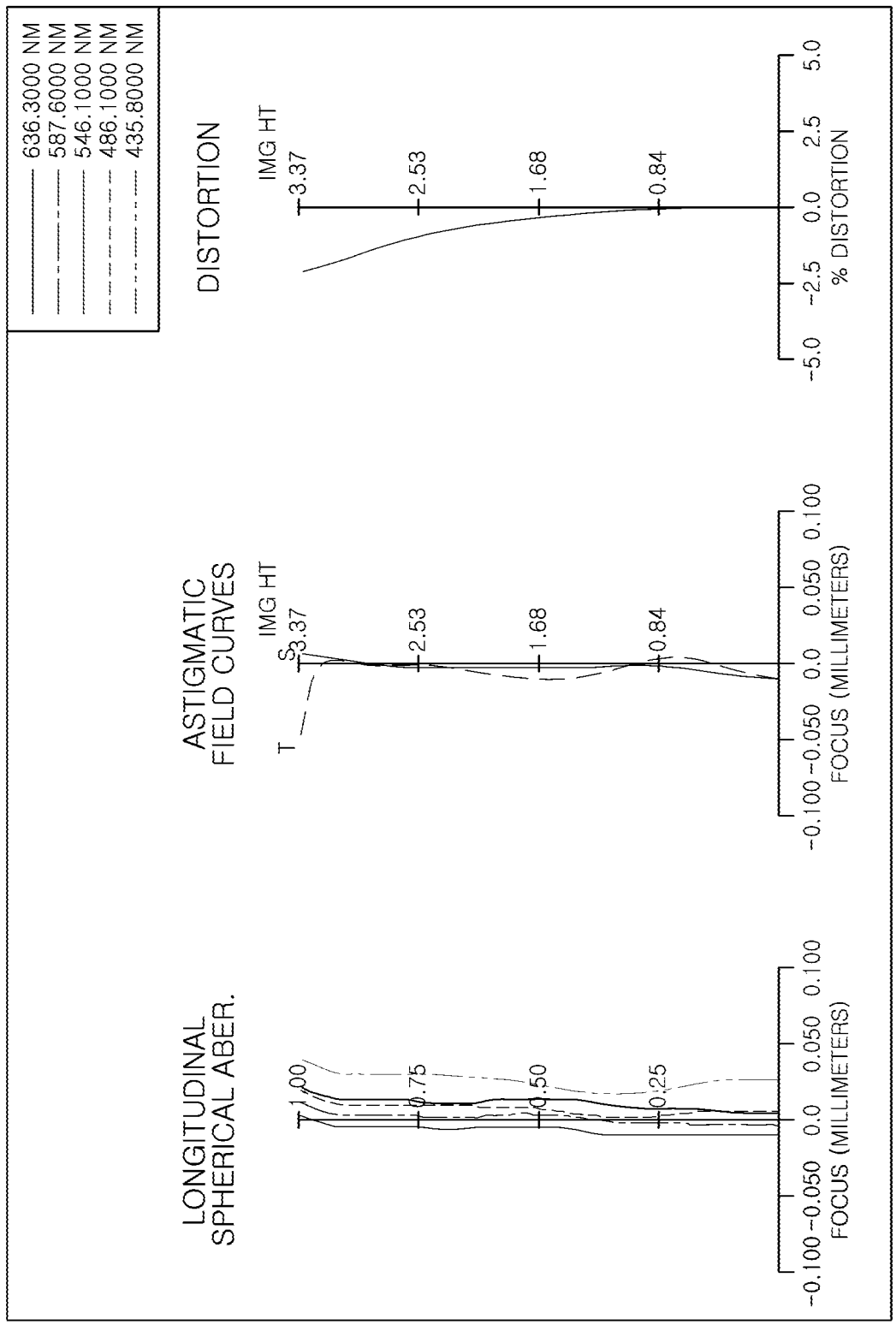
FIG. 20 shows aberration curves in a first zoom position of the optical imaging system illustrated in FIG. 19.
Figure 21:
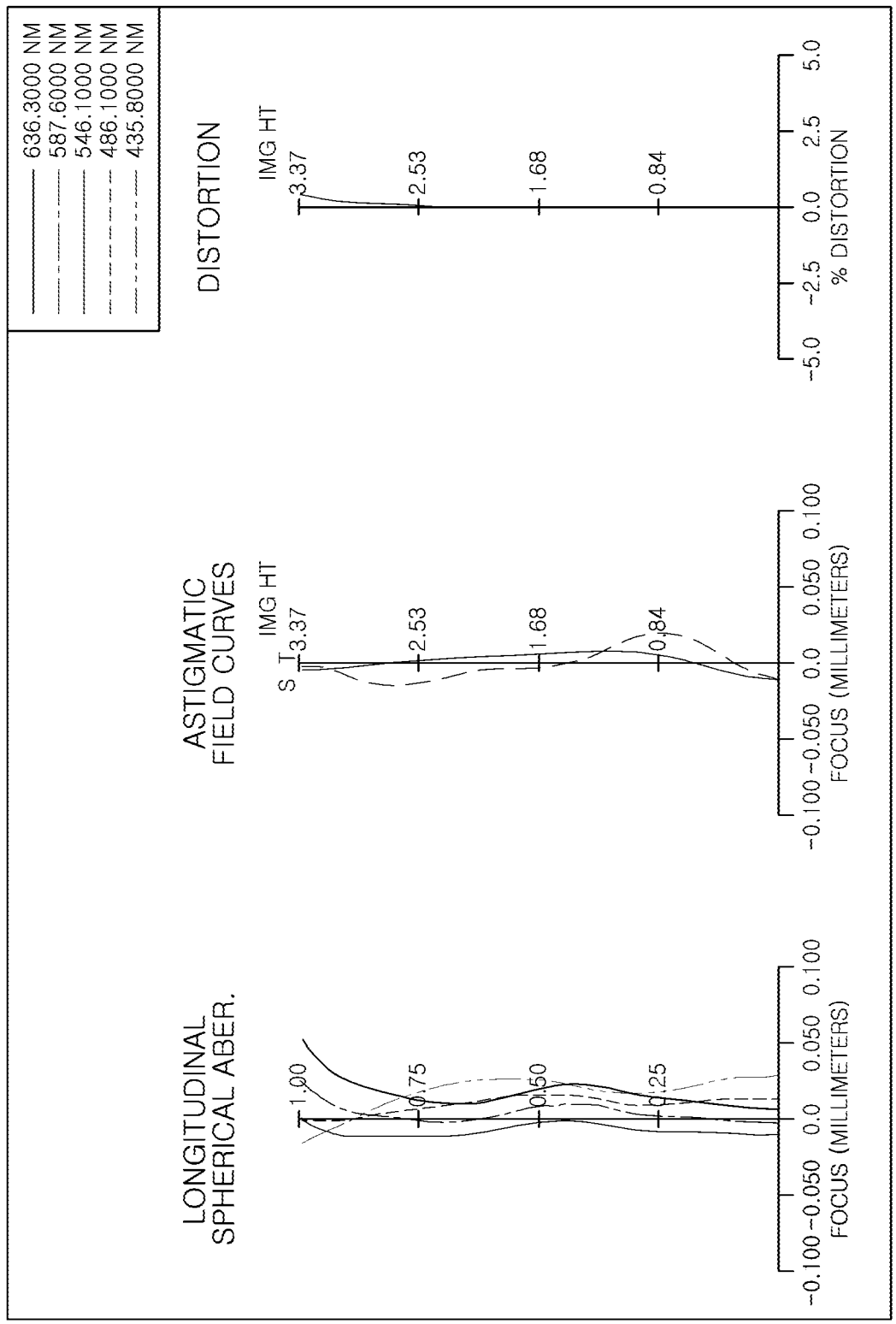
FIG. 21 shows aberration curves in a second zoom position of the optical imaging system illustrated in FIG. 19.

In addition, the lens group G1, G2, and G3 are moved in an optical axis direction to change the focal length of the optical imaging system. For example, at least one of the first lens group G1, the second lens group G2, and the third lens group G3 may be moved on a second optical axis C2. In addition, the first lens group G1, the second lens group G2, and the third lens group G3 are moved along a second optical axis C2 with different sizes to significantly reduce displacement amount for focus adjustment. The above-configured optical imaging system exhibits aberration characteristics in different zoom positions, as illustrated in FIGS. 20 and 21.

The optical imaging system 700 includes a prism P, a stop ST, a filter 780, and an image sensor 70.

The optical imaging system includes a prism P as a mechanism for folding or bending an optical path. The prism P folds light, incident on the first optical axis C1, in a direction of the second optical axis C2. The second optical axis C2, folded by the prism P, may have a substantially right angle to the first optical axis C1. The prism P is disposed on an object side of the first lens 710. The prism P disposed as described above refracts light, reflected from an object (a subject), to the image sensor 790.

The filter 780 is disposed in front of the image sensor 790 to cut off infrared rays, or the like, included in the incident light. The image sensor 790 includes a plurality of optical sensors. The above-configured image sensor 790 is configured to convert an optical signal into an electrical signal.

Table 19 shows lens characteristics of the optical imaging system according to this example, Table 20 shows aspherical values of the optical imaging system according to this example, and Table 21 shows distance values between lens groups depending on a first position and a second position of the optical imaging system.

TABLE 19

| Surface No. | Remark | Radius of Curvature | Thickness/Gap | Focal Length | Refractive Index | Abbe Number |
|---|---|---|---|---|---|---|
| 0 | Object | infinity | infinity | | | |
| 1 | Prism | infinity | 2.9000 | | 1.6349 | 23.900 |
| 2 | | infinity | 2.9000 | | 1.6349 | 23.900 |
| 3 | | infinity | 2.2000 | | | |
| 4* | First Lens | 10.42033 | 1.6500 | 24.0850 | 1.6600 | 20.400 |

TABLE 19-continued

| Surface No. | Remark | Radius of Curvature | Thickness/Gap | Focal Length | Refractive Index | Abbe Number |
|---|---|---|---|---|---|---|
| 5* | | 27.64531 | 1.6000 | | | |
| 6* | Second | 35.14569 | 1.0000 | −8.0080 | 1.5676 | 37.300 |
| 7* | Lens | 4.00586 | 0.0000 | | | |
| 8 | Stop | infinity | D1 | | | |
| 9* | Third Lens | 4.47432 | 1.8000 | 6.7990 | 1.5441 | 56.000 |
| 10* | | −18.81158 | 0.2667 | | | |
| 11* | Fourth | −27.52542 | 1.2000 | −7.7550 | 1.6150 | 25.900 |
| 12* | Lens | 5.93032 | 0.1266 | | | |
| 13* | Fifth Lens | 5.04342 | 1.2835 | 8.4730 | 1.5441 | 56.000 |
| 14* | | −51.47221 | D2 | | | |
| 15* | Sixth Lens | −20.39735 | 3.3800 | 14.4270 | 1.6714 | 19.200 |
| 16* | | −7.06491 | 0.5340 | | | |
| 17* | Seventh | −11.86702 | 0.6805 | −8.3960 | 1.5441 | 56.000 |
| 18* | Lens | 7.63279 | D3 | | | |
| 19 | Filter | infinity | 0.1917 | | 1.5167 | 64.100 |
| 20 | | infinity | 0.4963 | | | |
| 21 | Imaging plane | infinity | 0.1520 | | | |

(In Table 19, *marked surfaces are aspherical surfaces)

TABLE 20

| Surface No. | K | A | B | C | D |
|---|---|---|---|---|---|
| 4 | −12.68660596 | 0.002875358 | −0.000272351 | 0.000110349 | −4.16E−05 |
| 5 | −99 | 0.002971219 | −0.000651055 | 0.000390784 | −0.000199462 |
| 6 | 4.47E−07 | −0.009507792 | −4.56E−07 | 0.000844579 | −0.000642104 |
| 7 | −0.054145173 | −0.014385284 | 0.00128898 | −0.000127206 | 8.87E−05 |
| 9 | 0.092322522 | −0.000505279 | 0.000642298 | −0.000473704 | 0.000194286 |
| 10 | −13.48838064 | −0.011603747 | 0.016822708 | −0.012175239 | 0.005257565 |
| 11 | −3.69E−06 | −0.020484284 | 0.025339476 | −0.018134851 | 0.007817449 |
| 12 | 0.185945644 | −0.033619946 | 0.040706855 | −0.026747841 | 0.009720017 |
| 13 | 0.268736189 | −0.022299014 | 0.031854471 | −0.020398398 | 0.007149082 |
| 14 | −9.65E−07 | 0.006917828 | 0.000587446 | −0.001264354 | 0.001518079 |
| 15 | −6.70287039 | 0.001006262 | 0.001220583 | −0.001463012 | 0.000664361 |
| 16 | −2.096747243 | −0.002501255 | 0.002904838 | −0.000937567 | −0.000186066 |
| 17 | 7.40E−05 | −0.032307759 | 0.021228335 | −0.010322988 | 0.00314837 |
| 18 | 1.592605829 | −0.030107116 | 0.017082552 | −0.008345789 | 0.002850092 |

| Surface No. | E | F | G | H | I |
|---|---|---|---|---|---|
| 4 | 1.05E−05 | −1.74E−06 | 1.79E−07 | −1.03E−08 | 2.54E−10 |
| 5 | 6.74E−05 | −1.52E−05 | 2.16E−06 | −1.74E−07 | 6.07E−09 |
| 6 | 0.000304498 | −9.55E−05 | 1.86E−05 | −2.03E−06 | 9.42E−08 |
| 7 | −6.48E−05 | 2.19E−05 | −3.74E−06 | 2.99E−07 | −7.39E−09 |
| 9 | −4.09E−05 | 4.11E−06 | −3.25E−08 | −2.84E−08 | 1.62E−09 |
| 10 | −1.39E−03 | 0.000229265 | −2.31E−05 | 1.30E−06 | −3.13E−08 |
| 11 | −0.002080083 | 0.000345184 | −3.50E−05 | 2.00E−06 | −4.98E−08 |
| 12 | −0.00180629 | 0.000105674 | 1.75E−05 | −3.24E−06 | 1.56E−07 |
| 13 | −0.001262142 | 6.91E−05 | 1.08E−05 | −1.84E−06 | 7.99E−08 |
| 14 | −0.000972989 | 0.00036276 | −7.66E−05 | 8.45E−06 | −3.79E−07 |
| 15 | −0.000166505 | 2.31E−05 | −1.76E−06 | 6.86E−08 | −1.07E−09 |
| 16 | 0.000187943 | −4.76E−05 | 5.67E−06 | −3.26E−07 | 7.32E−09 |
| 17 | −0.000556141 | 5.69E−05 | −3.33E−06 | 1.04E−07 | −1.34E−09 |
| 18 | −0.000628927 | 8.86E−05 | −7.62E−06 | 3.59E−07 | −7.02E−09 |

TABLE 21

| Note | First Position | Second Position |
|---|---|---|
| D1 | 4.48000 | 1.09500 |
| D2 | 3.72872 | 4.16075 |
| D3 | 2.72000 | 5.67000 |

The optical imaging system according to the above-described example may share the following features. For example, a focal length of a first lens is generally determined in the range of 20 to 30 mm, a focal length of a second lens is determined in the range of −10.0 to −7.0 mm, and a focal length of a third lens is generally in the range of 6.0 to 8.0 mm, a focal length of a fourth lens is determined in the range of −11.0 to −6.0 mm, a focal length of a fifth lens is generally determined in the range of 7.5 to 15 mm, a focal length of a sixth lens is determined in the range of 10 to 30 mm, a focal length of a seventh lens may be determined in the range of −14 to −6.0 mm. An overall focal length of the optical imaging system is determined in the range of 12 to 15 mm, and a zoom ratio of the optical imaging system may be 1.6 to 2.2.

In a first position of an optical imaging system, a distance D1 between a first lens group and a second lens group is greater than a distance D3 between a third lens group and an imaging plane, and a distance D2 between the second lens group and a third lens group is greater than a distance D3 between the third lens group and the imaging plane.

In a second position of an optical imaging system, a distance D1 between a first lens group and a second lens group is less than a distance D2 between the second lens group and a third lens group, and a distance D2 between the second lens group and the third lens is less than a distance D3 between the third lens group and an imaging plane.

Table 22 shows effective major axis radii [mm] of the lenses according to the respective examples, and Table 23 shows effective minor axis radii [mm] of the lenses according to the respective examples.

TABLE 22

| Note | First Example | Second Example | Third Example | Fourth Example | Fifth Example | Sixth Example | Seventh Example |
|---|---|---|---|---|---|---|---|
| PS1el | 5.000 | 5.000 | 4.000 | 4.000 | 5.000 | 5.000 | 4.000 |
| PS2el | 4.238 | 4.450 | 3.584 | 3.641 | 4.317 | 4.450 | 3.679 |
| PS3el | 5.000 | 5.000 | 4.000 | 4.000 | 5.000 | 5.000 | 4.000 |
| L1S1el | 3.200 | 3.200 | 2.450 | 2.500 | 3.200 | 3.200 | 2.550 |
| L1S2el | 2.876 | 2.928 | 2.306 | 2.306 | 2.825 | 2.914 | 2.327 |
| L2S1el | 2.651 | 2.704 | 2.103 | 2.069 | 2.572 | 2.698 | 2.055 |
| L2S2el | 2.609 | 2.628 | 2.064 | 2.035 | 2.512 | 2.635 | 1.984 |
| L3S1el | 2.800 | 2.780 | 2.180 | 2.180 | 2.650 | 2.780 | 2.100 |
| L3S2el | 2.670 | 2.701 | 2.157 | 2.107 | 2.645 | 2.700 | 2.081 |
| L4S1el | 2.570 | 2.584 | 2.131 | 2.027 | 2.602 | 2.589 | 2.070 |
| L4S2el | 2.565 | 2.488 | 2.079 | 2.000 | 2.637 | 2.490 | 2.091 |
| L5S1el | 2.651 | 2.550 | 2.169 | 2.100 | 2.721 | 2.550 | 2.198 |
| L5S2el | 2.611 | 2.520 | 2.090 | 2.042 | 2.663 | 2.521 | 2.118 |
| L6S1el | 2.726 | 2.603 | 2.550 | 2.550 | 2.818 | 2.593 | 2.600 |
| L6S2el | 3.250 | 3.050 | 2.504 | 2.582 | 3.430 | 3.050 | 2.662 |
| L7S1el | 3.230 | 3.026 | 2.500 | 2.555 | 3.426 | 3.037 | 2.600 |
| L7S2el | 3.396 | 3.201 | 2.689 | 2.750 | 3.487 | 3.226 | 2.736 |

TABLE 23

| Note | First Example | Second Example | Third Example | Fourth Example | Fifth Example | Sixth Example | Seventh Example |
|---|---|---|---|---|---|---|---|
| L1S1es | 2.240 | 2.240 | 1.715 | 1.750 | 2.240 | 2.240 | 1.785 |
| L1S2es | 2.013 | 2.049 | 1.614 | 1.614 | 1.977 | 2.040 | 1.629 |
| L2S1es | 1.856 | 1.893 | 1.472 | 1.448 | 1.800 | 1.889 | 1.439 |
| L2S2es | 1.826 | 1.839 | 1.445 | 1.425 | 1.758 | 1.844 | 1.389 |
| L3S1es | 1.960 | 1.946 | 1.526 | 1.526 | 1.855 | 1.946 | 1.470 |
| L3S2es | 1.869 | 1.891 | 1.510 | 1.475 | 1.852 | 1.890 | 1.457 |
| L4S1es | 1.799 | 1.809 | 1.492 | 1.419 | 1.821 | 1.812 | 1.449 |
| L4S2es | 1.795 | 1.741 | 1.455 | 1.400 | 1.846 | 1.743 | 1.464 |
| L5S1es | 1.856 | 1.785 | 1.519 | 1.470 | 1.905 | 1.785 | 1.539 |
| L5S2es | 1.828 | 1.764 | 1.463 | 1.429 | 1.864 | 1.765 | 1.483 |
| L6S1es | 1.908 | 1.822 | 1.785 | 1.785 | 1.972 | 1.815 | 1.820 |
| L6S2es | 2.275 | 2.135 | 1.753 | 1.807 | 2.401 | 2.135 | 1.863 |
| L7S1es | 2.261 | 2.118 | 1.750 | 1.789 | 2.398 | 2.126 | 1.820 |
| L7S2es | 2.377 | 2.241 | 1.882 | 1.925 | 2.441 | 2.258 | 1.915 |

Table 24 show optical characteristics of the optical imaging systems according to the first to seventh examples.

TABLE 24

| Note | First Example | Second Example | Third Example | Fourth Example | Fifth Example | Sixth Example | Seventh Example |
|---|---|---|---|---|---|---|---|
| f | 14.000 | 14.000 | 12.800 | 12.800 | 14.000 | 14.000 | 12.800 |
| fG1 | −16.851 | −17.052 | −15.697 | −15.755 | −16.855 | −17.340 | −15.783 |
| fG2 | 7.700 | 7.996 | 7.294 | 7.354 | 7.764 | 8.036 | 7.298 |
| fG3 | −20.000 | −20.000 | −18.262 | −18.499 | −19.999 | −19.999 | −19.538 |
| f-number | 2.9~3.9 | 3.0~4.0 | 3.5~4.7 | 3.4~4.5 | 3.1~4.1 | 3.0~4.0 | 3.5~4.7 |
| IMG_HT | 4.000 | 4.000 | 3.266 | 3.266 | 4.000 | 4.000 | 3.266 |
| FOV | 32.62~19.78 | 32.46~19.76 | 29.14~17.72 | 29.16~17.6 | 32.6~19.82 | 32.4~19.78 | 29.16~17.6 |
| 2θ | 91.146 | 91.146 | 91.146 | 91.146 | 91.146 | 91.146 | 91.146 |
| AL1 | 26.118 | 26.118 | 15.310 | 15.941 | 26.118 | 26.118 | 16.585 |
| BFL | 4.117 | 4.045 | 3.604 | 3.560 | 4.156 | 3.857 | 3.560 |
| TTL | 27.821 | 27.240 | 23.416 | 25.310 | 27.790 | 27.240 | 25.290 |
| PTTL | 32.021 | 32.440 | 28.620 | 30.192 | 32.450 | 32.440 | 30.390 |

Tables 25 to 27 show conditional expressions values of the optical imaging systems according to the first to seventh examples. As can be seen from Tables 25 to 27, the optical imaging systems according to the first to seventh examples satisfy all of the above-mentioned conditional expressions.

TABLE 25

| Conditional Expression | First Example | Second Example | Third Example | Fourth Example | Fifth Example | Sixth Example | Seventh Example |
|---|---|---|---|---|---|---|---|
| L3R2/f | −1.0389 | −1.1165 | −1.8119 | −1.2454 | −0.6844 | −1.1904 | −1.4697 |
| (L3R1 + L3R2)/(L3R1 − L3R2) | −0.4883 | −0.5022 | −0.6904 | −0.5480 | −0.3058 | −0.5252 | −0.6157 |
| L6R2/f | −0.4882 | −0.5715 | −0.8270 | −0.5055 | −0.4834 | −0.5823 | −0.5519 |
| (L6R1 + L6R2)/(L6R1 − L6R2) | 4.4637 | 2.6638 | 2.4225 | 1.9229 | 3.8718 | 2.8462 | 2.0598 |
| f/f1 | 0.5568 | 0.5370 | 0.6252 | 0.5461 | 0.5473 | 0.5319 | 0.5315 |
| f/f3 | 1.9805 | 1.8996 | 1.9090 | 1.8768 | 2.1773 | 1.8717 | 1.8826 |
| f/f4 | −1.5592 | −1.6525 | −1.5587 | −1.8711 | −1.4946 | −1.6085 | −1.6505 |
| f/f5 | 1.3822 | 1.4788 | 1.3542 | 1.7105 | 1.0616 | 1.4608 | 1.5107 |
| Nd6-Nd7 | 0.1273 | 0.1273 | 0.1273 | 0.1273 | 0.1273 | 0.1273 | 0.1273 |

TABLE 26

| Note | First Example | Second Example | Third Example | Fourth Example | Fifth Example | Sixth Example | Seventh Example |
|---|---|---|---|---|---|---|---|
| L1S1es/L1S1el | 0.700 | 0.700 | 0.700 | 0.700 | 0.700 | 0.700 | 0.700 |
| L1S2es/L1S2el | 0.700 | 0.700 | 0.700 | 0.700 | 0.700 | 0.700 | 0.700 |
| L2S1es/L2S1el | 0.700 | 0.700 | 0.700 | 0.700 | 0.700 | 0.700 | 0.700 |
| L2S2es/L2S2el | 0.700 | 0.700 | 0.700 | 0.700 | 0.700 | 0.700 | 0.700 |
| DPL1 | 1.450 | 2.000 | 2.283 | 2.283 | 1.460 | 2.000 | 2.200 |
| SPY2/SPX2 | 0.700 | 0.700 | 0.700 | 0.700 | 0.700 | 0.700 | 0.700 |
| L1S1el/IMG_HT | 0.800 | 0.800 | 0.750 | 0.765 | 0.800 | 0.800 | 0.781 |

TABLE 27

| Note | First Example | Second Example | Third Example | Fourth Example | Fifth Example | Sixth Example | Seventh Example |
|---|---|---|---|---|---|---|---|
| L1S1el/PTTL | 0.0999 | 0.0986 | 0.0856 | 0.0828 | 0.0986 | 0.0986 | 0.0839 |
| L1S1es/PTTL | 0.0700 | 0.0691 | 0.0599 | 0.0580 | 0.0690 | 0.0691 | 0.0587 |
| L2S1el/PTTL | 0.0828 | 0.0834 | 0.0735 | 0.0685 | 0.0793 | 0.0832 | 0.0676 |
| L2S1es/PTTL | 0.0580 | 0.0584 | 0.0514 | 0.0480 | 0.0555 | 0.0582 | 0.0473 |
| AL1/(PTTL)2 | 0.0255 | 0.0248 | 0.0187 | 0.0175 | 0.0248 | 0.0248 | 0.0180 |
| BFL/2IMG_HT | 0.5146 | 0.5057 | 0.5517 | 0.5450 | 0.5195 | 0.4822 | 0.5450 |

Figure 22:
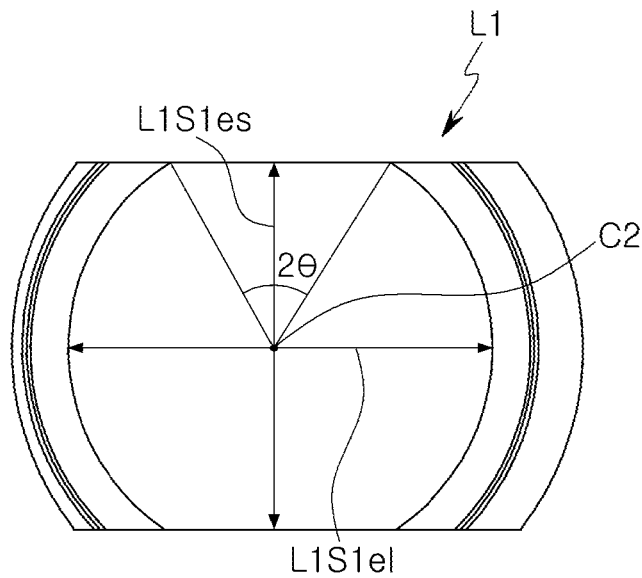
FIG. 22 is a plan view of a first lens provided in an optical imaging system according to the present disclosure.
Figure 23:
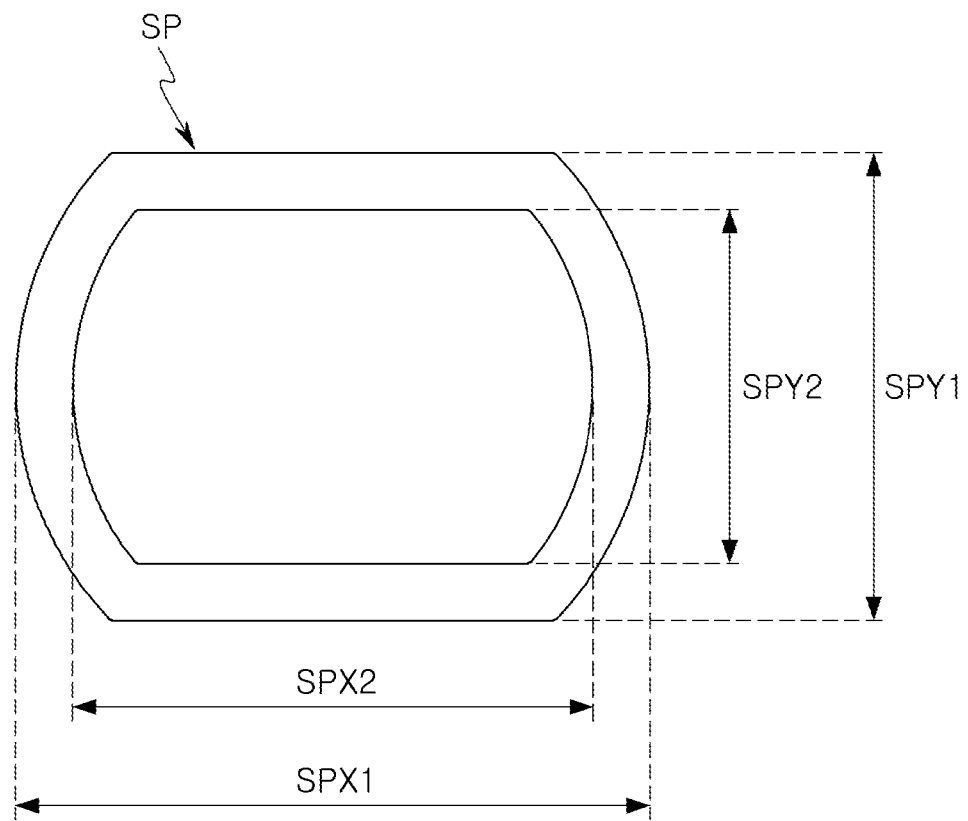
FIG. 23 is a plan view of a gap maintaining member disposed between the first lens and the second lens of the optical imaging system illustrated in FIG. 1.

The optical imaging system according to the various examples includes a lens, having a shapes illustrated in FIGS. 22 and 23, and a gap maintaining member. For reference, only a shape of a first lens is illustrated in FIG. 22, but it is noted that second to seventh lenses may also be configured to have shapes illustrated in FIG. 22.

The first lens L1 may be configured to have different lengths in a first direction and a second direction crossing the optical axis. For example, in the first lens L1, an effective radius in the first direction (hereinafter, referred to as a major axis effective radius) L1S1el may be greater than an effective radius in the second direction (hereinafter, referred to as a minor axis effective radius) L1S1es. One surface of the first lens L1 may be formed in a straight-line form. For example, both side surfaces parallel to the major axis effective radius of the first lens L1 may be formed in a straight line, as illustrated in FIG. 22. A range, linearly formed in the first lens L1, may be limited to a predetermined size. For example, an angle 2θ, formed between both an optical axis center C2 and both ends of a linear portion of the first lens L1 may be selected in the range of 80 to 92 degrees.

The gap maintaining member SP may be formed in a substantially rectangular shape, as illustrated in FIG. 23. For example, a length SPX1 of the gap maintaining member SP in the first direction may be greater than a length SPY1 of the gap maintaining member SP in the second direction. Holes of the gap maintaining member SP may be substantially the same or similar in the form of an effective diameter of a lens. A hole of the gap maintaining member SP according to this example may have a pair of parallel straight lines and a pair of curves, as illustrated in FIG. 23. In the hole of the gap maintaining member SP, a length SPX2 in the first direction may be greater than a length SPY2 in the second direction.

The optical imaging system according to the various examples may be mounted in a small terminal. For example, at least one of the optical imaging systems according to the above-described examples may be mounted on a rear surface or a front surface of a small terminal 10, as illustrated in FIGS. 24 to 27.

Figure 24:
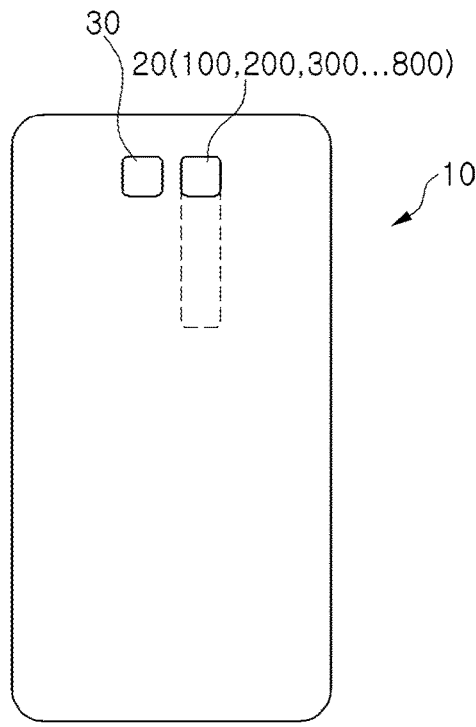
FIGS. 24, 25, 26, and 27 are rear views of a portable terminal provided with an optical imaging system according to the present disclosure.
Figure 25:
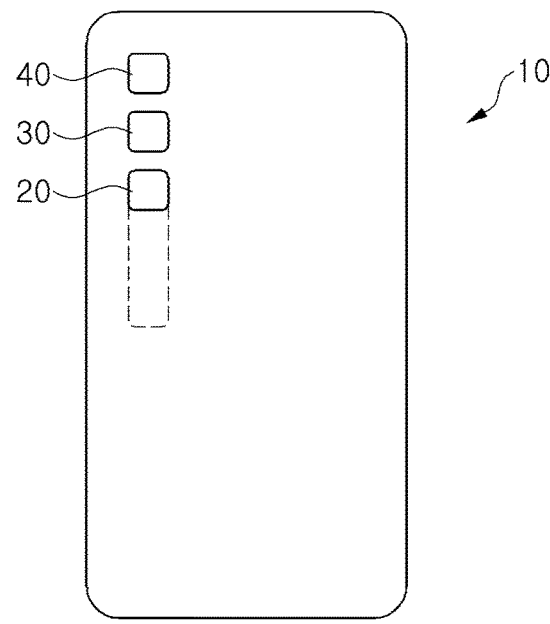
Figure 26:
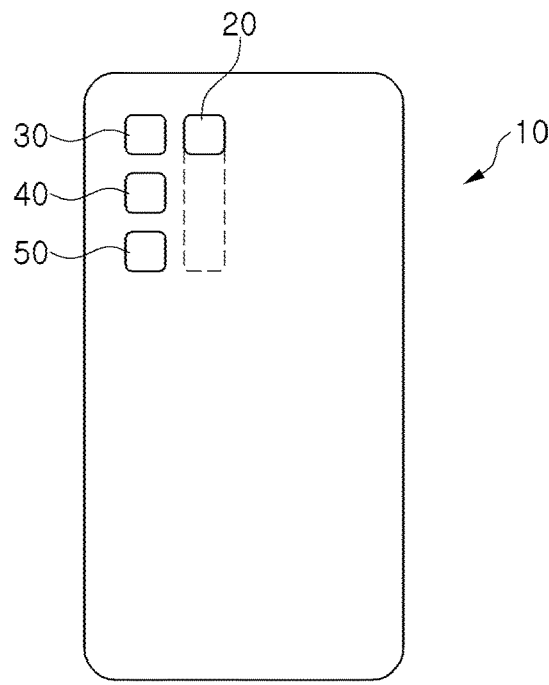
Figure 27:
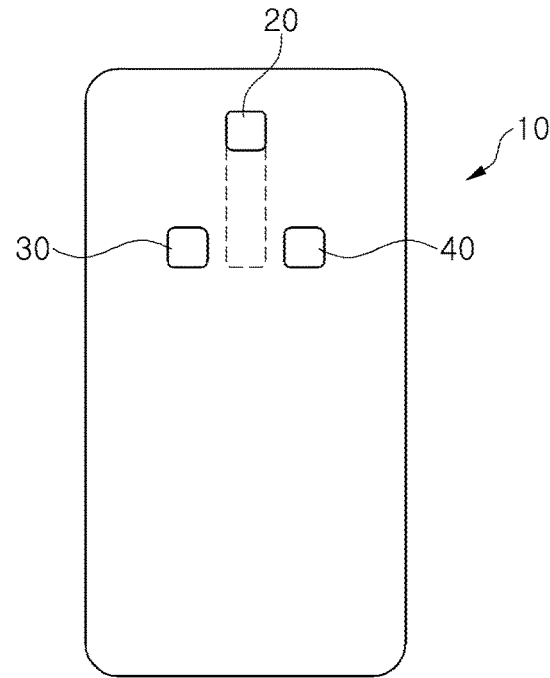

The small terminal 10 may include a plurality of optical imaging systems 20, 30, 40, and 50. As an example, the small terminal 10 may include an optical imaging system 20 for capturing a long distance view and an optical imaging system 30 for capturing a short distance view, as illustrated in FIG. 24. As another example, the small terminal 10 may include an optical imaging system 20 for capturing a long distance view and two optical imaging systems 30 and 40 for capturing a short distance view, as illustrated in FIG. 25. As another example, the small terminal 10 may include an optical imaging system 20 for capturing a long distance view and optical imaging systems 30, 40, and 50 having different focal lengths to each other.

An arrangement form of the optical imaging systems 20, 30, 40, and 50 may be variously modified, as illustrated in FIGS. 24 to 27.

As described above, an optical imaging system, which may be mounted in a thinned small-sized terminal while having a long focal length, may be implemented.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
   a first lens group with negative refractive power;
   a second lens group with a refractive power; and
   a third lens group with a refractive power,
   wherein the first to third lens groups are sequentially disposed from an object side to an imaging plane,
   wherein the first to third lens groups have a total number of seven lenses with refractive power,
   wherein a foremost lens among the first lens group has positive refractive power, and
   wherein $-1.50 < L6R2/f < -0.5$, where L6R2 is a radius of curvature of an image-side surface of a sixth lens disposed foremost among the third lens group and f is a focal length of the optical imaging system.

2. The optical imaging system of claim 1, wherein a foremost lens among the first lens group has a convex object-side surface.

3. The optical imaging system of claim 1, wherein a rearmost lens among the first lens group has a convex object-side surface.

4. The optical imaging system of claim 1, wherein a rearmost lens among the first lens group has a concave image-side surface.

5. The optical imaging system of claim 1, wherein a foremost lens among the second lens group has positive refractive power.

6. The optical imaging system of claim 1, wherein a foremost lens among the second lens group has a convex object-side surface.

7. The optical imaging system of claim 1, wherein a foremost lens among the second lens group has a convex image-side surface.

8. The optical imaging system of claim 1, wherein a rearmost lens among the second lens group has a concave image-side surface.

9. The optical imaging system of claim 1, wherein the third lens group has a total number of two lenses with refractive power.

10. The optical imaging system of claim 1, wherein the sixth lens has positive refractive power.

11. The optical imaging system of claim 1, wherein the sixth lens has a concave object-side surface.

12. The optical imaging system of claim 1, wherein the sixth lens has a convex image-side surface.

13. The optical imaging system of claim 1, wherein a rearmost lens among the third lens group has a concave image-side surface.

14. The optical imaging system of claim 1, wherein $0.10 < f/f1 < 0.8$, where f1 is a focal length of a foremost lens among the first lens group.

15. The optical imaging system of claim 1, wherein $3.0 < f/IMG\_HT < 4.0$, where IMG_HT is half of a diagonal length of the imaging plane.

16. The optical imaging system of claim 1, wherein $-20 \text{ mm} < fG1 < -13.0 \text{ mm}$, where fG1 is a focal length of the first lens group.

17. The optical imaging system of claim 1, wherein $5.0 \text{ mm} < fG2 < 10.0 \text{ mm}$, where fG2 is a focal length of the second lens group.

* * * * *